United States Patent
Fisher et al.

(10) Patent No.: US 9,913,389 B2
(45) Date of Patent: Mar. 6, 2018

(54) TAMPER-RESPONDENT ASSEMBLY WITH VENT STRUCTURE

(71) Applicant: INTERNATIONAL BUSINESS MACHINES CORPORATION, Armonk, NY (US)

(72) Inventors: Michael J. Fisher, Poughkeepsie, NY (US); David C. Long, Wappingers Falls, NY (US); Michael T. Peets, Staatsburg, NY (US); Robert Weiss, Poughkeepsie, NY (US); Thomas Weiss, Poughkeepsie, NY (US); James E. Tersigni, Highland, NY (US)

(73) Assignee: INTERNATIONAL BUSINESS CORPORATION CORPORATION, Armonk, NY (US)

( * ) Notice: Subject to any disclaimer, the term of this patent is extended or adjusted under 35 U.S.C. 154(b) by 148 days.

(21) Appl. No.: 14/955,283

(22) Filed: Dec. 1, 2015

(65) Prior Publication Data
US 2017/0156223 A1  Jun. 1, 2017

(51) Int. Cl.
*H05K 7/00* (2006.01)
*H05K 5/02* (2006.01)
(Continued)

(52) U.S. Cl.
CPC .......... *H05K 5/0208* (2013.01); *G06F 21/00* (2013.01); *G06F 21/86* (2013.01)

(58) Field of Classification Search
None
See application file for complete search history.

(56) References Cited

U.S. PATENT DOCUMENTS

| 3,165,569 A | 1/1965 | Bright et al. |
| 4,160,503 A | 7/1979 | Ohlbach |

(Continued)

FOREIGN PATENT DOCUMENTS

| CN | 201430639 Y | 3/2010 |
| CN | 104346587 A | 2/2015 |

(Continued)

OTHER PUBLICATIONS

Pamula et al., "Cooling of Integrated Circuits Using Droplet-Based Microfluidics", Association for Computing Machinery (ACM), GLSVLSI'03, Apr. 28-29, 2003 (pp. 84-87).

(Continued)

*Primary Examiner* — Courtney Smith
*Assistant Examiner* — Rashen E Morrison
(74) *Attorney, Agent, or Firm* — Teddi Maranzano, Esq.; Kevin P. Radigan, Esq.; Helsin Rothenberg Farley & Mesiti P.C.

(57) ABSTRACT

Tamper-respondent assemblies, electronic packages and fabrication methods are provided which incorporate a vent structure. The tamper-respondent assembly includes an electronic enclosure to enclose, at least in part, an electronic component(s) to be protected. The electronic enclosure includes an inner surface, and an air vent. A tamper-respondent electronic circuit structure is provided which includes a tamper-respondent sensor disposed to cover, at least part, the inner surface of the electronic enclosure, and define, at least in part, a secure volume about the electronic component(s). The vent structure includes at least one air passage coupling in fluid communication the secure volume and the air vent of the electronic enclosure to allow air pressure within the secure volume to equalize with air pressure external to the tamper-respondent assembly.

18 Claims, 18 Drawing Sheets

(51) Int. Cl.
*G06F 21/00* (2013.01)
*G06F 21/86* (2013.01)

(56) References Cited

U.S. PATENT DOCUMENTS

| | | | |
|---|---|---|---|
| 4,211,324 A | 7/1980 | Olhback | |
| 4,324,823 A | 4/1982 | Ray, III | |
| 4,516,679 A | 5/1985 | Simpson | |
| 4,496,900 A | 6/1985 | Di Stefano et al. | |
| 4,593,384 A | 6/1986 | Kleijne | |
| 4,609,104 A | 9/1986 | Kasper et al. | |
| 4,653,252 A | 3/1987 | van de Haar et al. | |
| 4,677,809 A | 7/1987 | Long et al. | |
| 4,691,350 A | 9/1987 | Kleijne et al. | |
| 4,807,284 A | 2/1989 | Kleijne | |
| 4,811,288 A | 3/1989 | Kleijne et al. | |
| 4,860,351 A | 8/1989 | Weingart | |
| 4,865,197 A | 9/1989 | Craig | |
| 5,009,311 A | 4/1991 | Schenk | |
| 5,027,397 A | 6/1991 | Double et al. | |
| 5,060,114 A | 10/1991 | Feinberg et al. | |
| 5,075,822 A | 12/1991 | Baumler et al. | |
| 5,117,457 A | 5/1992 | Comerford et al. | |
| 5,159,629 A | 10/1992 | Double et al. | |
| 5,185,717 A | 2/1993 | Mori | |
| 5,201,868 A | 4/1993 | Johnson | |
| 5,201,879 A | 4/1993 | Steele et al. | |
| 5,211,618 A | 5/1993 | Stoltz | |
| 5,239,664 A | 8/1993 | Verrier et al. | |
| 5,325,269 A * | 6/1994 | Someno | G06F 1/184 |
| | | | 361/785 |
| 5,389,738 A | 2/1995 | Piosenka et al. | |
| 5,406,630 A | 4/1995 | Piosenka et al. | |
| 5,506,566 A | 4/1996 | Oldfield et al. | |
| 5,568,124 A | 10/1996 | Joyce et al. | |
| 5,594,439 A | 1/1997 | Swanson | |
| 5,675,319 A | 10/1997 | Rivenberg et al. | |
| 5,715,652 A | 2/1998 | Stahlecker | |
| 5,761,054 A | 6/1998 | Kuhn | |
| 5,813,113 A | 9/1998 | Stewart et al. | |
| 5,858,500 A * | 1/1999 | MacPherson | E05G 1/14 |
| | | | 264/259 |
| 5,880,523 A | 3/1999 | Candelore | |
| 5,988,510 A | 11/1999 | Tuttle et al. | |
| 6,121,544 A | 9/2000 | Petsinger | |
| 6,195,267 B1 | 2/2001 | MacDonald, Jr. et al. | |
| 6,201,296 B1 | 3/2001 | Fries et al. | |
| 6,261,215 B1 | 7/2001 | Imer | |
| 6,301,096 B1 | 10/2001 | Wozniczka | |
| 6,384,397 B1 | 5/2002 | Takiar et al. | |
| 6,424,954 B1 | 7/2002 | Leon | |
| 6,438,825 B1 | 8/2002 | Kuhm | |
| 6,469,625 B1 | 10/2002 | Tomooka | |
| 6,473,304 B1 | 10/2002 | Stevens | |
| 6,512,454 B2 | 1/2003 | Miglioli et al. | |
| 6,643,995 B1 | 11/2003 | Kayama | |
| 6,686,539 B2 | 2/2004 | Farquhar et al. | |
| 6,746,960 B2 | 6/2004 | Goodman | |
| 6,798,660 B2 | 9/2004 | Moss et al. | |
| 6,853,093 B2 | 2/2005 | Cohen et al. | |
| 6,879,032 B2 | 4/2005 | Rosenau et al. | |
| 6,929,900 B2 | 8/2005 | Farquhar et al. | |
| 6,946,960 B2 * | 9/2005 | Sisson | G08B 13/149 |
| | | | 340/540 |
| 6,957,345 B2 | 10/2005 | Cesana et al. | |
| 6,970,360 B2 | 11/2005 | Sinha | |
| 6,985,362 B2 | 1/2006 | Mori et al. | |
| 6,991,961 B2 | 1/2006 | Hubbard et al. | |
| 6,996,953 B2 | 2/2006 | Perreault et al. | |
| 7,005,733 B2 | 2/2006 | Kommerling et al. | |
| 7,015,823 B1 | 5/2006 | Gillen et al. | |
| 7,054,162 B2 | 5/2006 | Benson et al. | |
| 7,057,896 B2 | 6/2006 | Matsuo et al. | |
| 7,094,143 B2 | 8/2006 | Wolm et al. | |
| 7,094,459 B2 | 8/2006 | Takahashi | |
| 7,095,615 B2 | 8/2006 | Nichols | |
| 7,156,233 B2 | 1/2007 | Clark et al. | |
| 7,180,008 B2 | 2/2007 | Heitmann et al. | |
| 7,189,360 B1 | 3/2007 | Ho | |
| 7,214,874 B2 * | 5/2007 | Dangler | H05K 5/0208 |
| | | | 174/17 VA |
| 7,247,791 B2 * | 7/2007 | Kulpa | H05K 5/0208 |
| | | | 174/17 R |
| 7,304,373 B2 | 12/2007 | Taggart et al. | |
| 7,310,737 B2 | 12/2007 | Patel et al. | |
| 7,465,887 B2 | 12/2008 | Suzuki et al. | |
| 7,475,474 B2 | 1/2009 | Heitmann et al. | |
| 7,515,418 B2 | 4/2009 | Straznicky et al. | |
| 7,549,064 B2 * | 6/2009 | Elbert | G06F 21/87 |
| | | | 340/550 |
| 7,640,658 B1 | 1/2010 | Pham et al. | |
| 7,643,290 B1 | 1/2010 | Narasimhan et al. | |
| 7,663,883 B2 | 2/2010 | Shirakami et al. | |
| 7,672,129 B1 | 3/2010 | Ouyang et al. | |
| 7,679,933 B2 * | 3/2010 | Makabe | G06F 1/185 |
| | | | 174/365 |
| 7,731,517 B2 | 6/2010 | Lee et al. | |
| 7,746,657 B2 | 6/2010 | Oprea et al. | |
| 7,760,086 B2 * | 7/2010 | Hunter | G06F 21/87 |
| | | | 340/540 |
| 7,768,005 B2 | 8/2010 | Condorelli et al. | |
| 7,783,994 B2 | 8/2010 | Ball et al. | |
| 7,787,256 B2 * | 8/2010 | Chan | G06F 21/87 |
| | | | 174/250 |
| 7,868,441 B2 | 1/2011 | Eaton et al. | |
| 7,898,413 B2 | 3/2011 | Hsu et al. | |
| 7,901,977 B1 | 3/2011 | Angelopoulos et al. | |
| 7,947,911 B1 | 5/2011 | Pham et al. | |
| 7,978,070 B2 * | 7/2011 | Hunter | G06K 19/073 |
| | | | 340/545.6 |
| 8,084,855 B2 | 12/2011 | Lower et al. | |
| 8,094,450 B2 | 1/2012 | Cole | |
| 8,101,267 B2 | 1/2012 | Samuels et al. | |
| 8,133,621 B2 | 3/2012 | Wormald et al. | |
| 8,199,506 B2 | 6/2012 | Janik et al. | |
| 8,287,336 B2 | 10/2012 | Dangler et al. | |
| 8,325,486 B2 | 12/2012 | Arshad et al. | |
| 8,516,269 B1 | 8/2013 | Hamlet et al. | |
| 8,589,703 B2 | 11/2013 | Lee | |
| 8,646,108 B2 | 2/2014 | Shiakallis et al. | |
| 8,659,506 B2 | 2/2014 | Nomizo | |
| 8,659,908 B2 * | 2/2014 | Adams | H01L 23/573 |
| | | | 361/765 |
| 8,664,047 B2 | 3/2014 | Lower et al. | |
| 8,716,606 B2 | 5/2014 | Kelley et al. | |
| 8,755,191 B2 * | 6/2014 | Riebel | H05K 7/1488 |
| | | | 361/679.38 |
| 8,797,059 B2 | 8/2014 | Boday et al. | |
| 8,836,509 B2 | 9/2014 | Lowy | |
| 8,853,839 B2 | 10/2014 | Gao et al. | |
| 8,879,266 B2 | 11/2014 | Jarvis et al. | |
| 8,890,298 B2 | 11/2014 | Buer et al. | |
| 8,934,244 B2 * | 1/2015 | Shelnutt | H05K 7/20254 |
| | | | 312/223.1 |
| 8,947,889 B2 * | 2/2015 | Kelley | H01L 23/573 |
| | | | 174/386 |
| 8,961,280 B2 | 2/2015 | Dangler et al. | |
| 9,003,199 B2 | 4/2015 | Dellmo et al. | |
| 9,011,762 B2 | 4/2015 | Seppa et al. | |
| 9,052,070 B2 | 6/2015 | Davis et al. | |
| 9,166,586 B2 * | 10/2015 | Carapelli | H03K 19/003 |
| 9,298,956 B2 | 3/2016 | Wade et al. | |
| 9,454,192 B2 * | 9/2016 | Farrow | G06F 1/181 |
| 9,661,747 B1 * | 5/2017 | Brodsky | H05K 1/0275 |
| 2001/0050425 A1 | 12/2001 | Beroz et al. | |
| 2001/0056542 A1 | 12/2001 | Cesana et al. | |
| 2002/0002683 A1 * | 1/2002 | Benson | G06F 21/86 |
| | | | 713/194 |
| 2002/0068384 A1 | 6/2002 | Beroz et al. | |
| 2002/0084090 A1 | 7/2002 | Farquhar | |
| 2003/0009684 A1 | 1/2003 | Schwenck et al. | |
| 2003/0031002 A1 * | 2/2003 | Siira | H05K 7/1454 |
| | | | 361/796 |

(56) References Cited

U.S. PATENT DOCUMENTS

| | | |
|---|---|---|
| 2004/0100762 A1* | 5/2004 | Yuan ............... G06F 1/184 361/679.39 |
| 2004/0228634 A1* | 11/2004 | Fricker ............. G02B 6/4453 398/135 |
| 2005/0068735 A1 | 3/2005 | Fissore et al. |
| 2005/0111194 A1 | 5/2005 | Sohn et al. |
| 2005/0180104 A1 | 8/2005 | Olesen et al. |
| 2005/0243507 A1* | 11/2005 | Lambert ............. G06F 1/187 361/679.39 |
| 2006/0034731 A1 | 2/2006 | Lewis et al. |
| 2006/0072288 A1 | 4/2006 | Stewart et al. |
| 2006/0196945 A1 | 9/2006 | Mendels |
| 2006/0218779 A1 | 10/2006 | Ooba et al. |
| 2007/0035933 A1* | 2/2007 | Chuang ............. H05K 7/1492 361/752 |
| 2007/0064396 A1 | 3/2007 | Oman et al. |
| 2007/0064399 A1 | 3/2007 | Mandel et al. |
| 2007/0091559 A1* | 4/2007 | Malone .............. G06F 1/187 361/679.32 |
| 2007/0108619 A1 | 5/2007 | Hsu |
| 2007/0140787 A1* | 6/2007 | Champion ........... G06F 1/183 403/321 |
| 2007/0201210 A1* | 8/2007 | Chow ............. H05K 7/20727 361/704 |
| 2007/0211436 A1 | 9/2007 | Robinson et al. |
| 2007/0230127 A1 | 10/2007 | Peugh et al. |
| 2007/0268671 A1 | 11/2007 | Brandenburg et al. |
| 2008/0050512 A1 | 2/2008 | Lower et al. |
| 2008/0144290 A1 | 6/2008 | Brandt et al. |
| 2008/0159539 A1 | 7/2008 | Huang et al. |
| 2008/0160274 A1 | 7/2008 | Dang et al. |
| 2008/0191174 A1* | 8/2008 | Ehrensvard ............ C09J 9/02 252/500 |
| 2008/0251906 A1 | 10/2008 | Eaton et al. |
| 2009/0073659 A1 | 3/2009 | Peng et al. |
| 2009/0097200 A1* | 4/2009 | Sharma ............... G06F 1/18 361/688 |
| 2009/0161312 A1* | 6/2009 | Spearing ........... H05K 7/20727 361/679.47 |
| 2009/0166065 A1 | 7/2009 | Clayton et al. |
| 2010/0088528 A1 | 4/2010 | Sion |
| 2010/0110647 A1 | 5/2010 | Hiew et al. |
| 2010/0177487 A1* | 7/2010 | Arshad ............... G06F 21/86 361/737 |
| 2010/0319986 A1 | 12/2010 | Bleau et al. |
| 2010/0321874 A1* | 12/2010 | Bhattacharyya ... H05K 7/20736 361/679.5 |
| 2011/0001237 A1 | 1/2011 | Brun et al. |
| 2011/0038123 A1 | 2/2011 | Janik et al. |
| 2011/0103027 A1 | 5/2011 | Aoki et al. |
| 2011/0241446 A1 | 10/2011 | Tucholski |
| 2011/0299244 A1 | 12/2011 | Dede et al. |
| 2012/0048685 A1* | 3/2012 | Chen ................. B65G 25/02 198/750.1 |
| 2012/0050998 A1* | 3/2012 | Klum ................. G06F 21/86 361/720 |
| 2012/0075815 A1* | 3/2012 | Fuke ................ H05K 7/1409 361/756 |
| 2012/0108093 A1* | 5/2012 | Sato ................ H01R 13/62994 439/160 |
| 2012/0113581 A1* | 5/2012 | Anguiano-Wehde ... G06F 1/187 361/679.33 |
| 2012/0117666 A1 | 5/2012 | Oggioni et al. |
| 2012/0140421 A1 | 6/2012 | Kirstine et al. |
| 2012/0149150 A1 | 6/2012 | Toh et al. |
| 2012/0170217 A1 | 7/2012 | Nishikimi et al. |
| 2012/0185636 A1 | 7/2012 | Leon et al. |
| 2012/0244742 A1 | 9/2012 | Wertz et al. |
| 2012/0256305 A1 | 10/2012 | Kaufmann et al. |
| 2012/0320529 A1 | 12/2012 | Loong et al. |
| 2013/0033818 A1 | 2/2013 | Hosoda et al. |
| 2013/0104252 A1 | 4/2013 | Yanamadala et al. |
| 2013/0141137 A1 | 6/2013 | Krutzik et al. |
| 2013/0158936 A1 | 6/2013 | Rich et al. |
| 2013/0208422 A1 | 8/2013 | Hughes et al. |
| 2013/0235527 A1 | 9/2013 | Wagner et al. |
| 2013/0283386 A1 | 10/2013 | Lee |
| 2014/0022733 A1 | 1/2014 | Lim et al. |
| 2014/0160679 A1 | 6/2014 | Kelty et al. |
| 2014/0184263 A1 | 7/2014 | Ehrenpfordt et al. |
| 2014/0204533 A1 | 7/2014 | Abeyasekera et al. |
| 2014/0321064 A1 | 10/2014 | Bose et al. |
| 2014/0325688 A1 | 10/2014 | Cashin et al. |
| 2015/0007427 A1 | 1/2015 | Dangler et al. |
| 2015/0195943 A1* | 7/2015 | Fricker ............. H05K 7/1409 361/679.58 |
| 2015/0235053 A1 | 8/2015 | Lee et al. |
| 2016/0005262 A1 | 1/2016 | Hirato et al. |
| 2016/0262270 A1* | 9/2016 | Isaacs ............... H05K 1/0203 |
| 2017/0019987 A1* | 1/2017 | Dragone ............ H05K 3/0014 |

FOREIGN PATENT DOCUMENTS

| | | |
|---|---|---|
| DE | 19816571 A1 | 10/1999 |
| DE | 19816572 A1 | 10/1999 |
| DE | 102012203955 A1 | 9/2013 |
| EP | 000566360 A1 | 10/1993 |
| EP | 0629497 A2 | 12/1994 |
| EP | 1184773 A1 | 3/2002 |
| EP | 1207444 A2 | 5/2002 |
| EP | 1 734 578 A1 | 12/2006 |
| EP | 1968362 A2 | 9/2008 |
| EP | 2104407 A1 | 9/2009 |
| EP | 1 672 464 B1 | 4/2012 |
| EP | 2560467 A1 | 2/2013 |
| JP | 61-297035 A | 12/1986 |
| JP | 2000-238141 A | 9/2000 |
| JP | 2013-125807 A | 6/2013 |
| JP | 2013-140112 A | 7/2013 |
| WO | WO9903675 A1 | 1/1999 |
| WO | WO1999/021142 A1 | 4/1999 |
| WO | WO2001/063994 A2 | 8/2001 |
| WO | WO 2003/012606 A2 | 2/2003 |
| WO | WO03025080 A1 | 3/2003 |
| WO | WO2004040505 A1 | 5/2004 |
| WO | WO 2009/042335 A1 | 4/2009 |
| WO | WO2009/092472 A1 | 7/2009 |
| WO | WO2010/128939 A1 | 11/2010 |
| WO | WO2013/004292 A1 | 1/2013 |
| WO | WO 2013/189483 A1 | 12/2013 |
| WO | WO2014/086987 A2 | 6/2014 |
| WO | WO2014/158159 A1 | 10/2014 |

OTHER PUBLICATIONS

Sample et al., "Design of an RFID-Based Battery-Free Programmable Sensing Platform", IEEE Transactions on Instrumentation and Measurement, vol. 57, No. 11, Nov. 2008 (pp. 2608-2615).

Cabral, Jr. et al., "Controlling Fragmentation of Chemically Strengthened Glass", U.S. Appl. No. 14/700,877, filed Apr. 30, 2015 (48 pages).

Isaacs et al., Office Action for U.S. Appl. No. 14/637,501, filed Mar. 4, 2015, dated May 4, 2016 (20 pages).

Fisher et al., Office Action for U.S. Appl. No. 14/963,681, filed Dec. 9, 2015, dated May 6, 2016 (10 pages).

Campbell et al., "Tamper-Proof Electronic Packages With Two-Phase Dielectric Fluid", U.S. Appl. No. 15/139,503, filed Apr. 27, 2016 (60 pages).

Busby et al., "Tamper-Proof Electronic Packages Formed With Stressed Glass", U.S. Appl. No. 15/154,077, filed May 13, 2016 (45 pages).

Busby et al., "Tamper-Proof Electronic Packages With Stressed Glass Component Substrate(s)", U.S. Appl. No. 15/154,088, filed May 13, 2016 (56 pages).

Fisher et al., "List of IBM Patents or Patent Applications Treated As Related" for U.S. Appl. No. 14/955,283, filed Dec. 1, 2015, dated May 18, 2016 (2 pages).

Anonymous, "Consolidated Non-Volatile Memory in a Chip Stack", IBM Technical Disclosure: IP.com No. IPCOM000185250, Jul. 16, 2009 (6 pages).

(56) References Cited

OTHER PUBLICATIONS

Anonymous, "Selective Memory Encryption", IBM Technical Disclosure: IP.com No. IPCOM000244183, Nov. 20, 2015 (6 pages).
Busby et al., "Multi-Layer Stack with Embedded Tamper-Detect Protection", U.S. Appl. No. 15/053,336, filed Feb. 25, 2016 (68 pages).
Fisher et al., "List of IBM Patents and/or Patent Applications Treated as Related", U.S. Appl. No. 14/955,283, filed Dec. 1, 2015, dated Mar. 7, 2016 (2 pages).
Holm, Ragnar, "Electric Contacts: Theory and Application", Spinger-Verlag, New York, 4th Edition, 1981 (pp. 10-19).
Clark, Andrew J., "Physical Protection of Cryptographic Devices", Advanced in Cyprtology, Eurocrypt '87, Springer, Berlin Heidelberg (1987) (11 pages).
Halperin et al., "Latent Open Testing of Electronic Packaging", MCMC-194, IEEE (1994) (pp. 83-33).
Jhang et al., "Nonlinear Ultrasonic Techniques for Non-Destructive Assessment of Micro Damage in Material: A Review", International Journal of Prec. Eng. & Manuf., vol. 10, No. 1, Jan. 2009 (pp. 123-135).
Isaacs et al., "Tamper Proof, Tamper Evident Encryption Technology", Pan Pacific Symposium SMTA Proceedings (2013) (9 pages).
Zhou et al., "Nonlinear Analysis for Hardware Trojan Detection", ICSPCC2015, IEEE (2015) (4 pages).
Brodsky et al., "Circuit Layouts of Tamper-Respondent Sensors", U.S. Appl. No. 15/187,002, filed Jun. 20, 2016 (110 pages).
Brodsky et al., "Tamper-Respondent Assemblies with Enclosure-to-Board Protection", U.S. Appl. No. 15/193,525, filed Jun. 27, 2016 (54 pages).
Fisher et al., "Applying Pressure to Adhesive Using CTE Mismatch Between Components", U.S. Appl. No. 15/193,556, filed Jun. 27, 2016 (71 pages).
Busby et al., "Tamper-Respondent Assembly with Nonlinearity Monitoring", U.S. Appl. No. 15/194,738, filed Jun. 28, 2016 (48 pages).
Dangler et al., "Tamper-Respondent Sensors with Formed Flexible Layer(s)", U.S. Appl. No. 15/249,663, filed Aug. 29, 2016 (109 pages).
Brodsky et al., "Overlapping, Discrete Tamper-Respondent Sensors", U.S. Appl. No. 15/249,671, filed Aug. 29, 2016 (109 pages).
Dangler et al., "Tamper-Respondent Assemblies with Region(s) of Increased Susceptibility to Damage", U.S. Appl. No. 15/249,676, filed Aug. 29, 2016 (110 pages).
Brodsky et al., Notice of Allowance for U.S. Appl. No. 14/974,036, filed Dec. 18, 2015, dated Jun. 3, 2016 (18 pages).
Fisher et al., Office Action for U.S. Appl. No. 14/865,686, filed Sep. 25, 2015, dated Jun. 29, 2016 (17 pages).
Fisher et al., Notice of Allowance for U.S. Appl. No. 14/963,681, filed Dec. 9, 2015, dated Jul. 5, 2016 (7 pages).
Brodsky et al., Office Action for U.S. Appl. No. 14/865,651, filed Sep. 25, 2015, dated Jul. 13, 2016 (10 pages).
Dragone et al., "Tamper-Respondent Assembly with Sensor Connection Adapter", U.S. Appl. No. 15/268,959, filed Sep. 19, 2016 (45 pages).
Dragone et al., "Vented Tamper-Respondent Assemblies", U.S. Appl. No. 15/275,748, filed Sep. 26, 2016 (53 pages).
Dragone et al., "Tamper-Respondent Assemblies with in Situ Vent Structure(s)", U.S. Appl. No. 15/275,762, filed Sep. 26, 2016 (72 pages).
Busby et al., "Tamper-Respondent Assemblies with Trace Regions of Increased Susceptibility to Breaking", U.S. Appl. No. 15/341,108, filed Nov. 2, 2016 (56 pages).
Brodsky et al., "Enclosure with Inner Tamper-Respondent Sensor(s)", U.S. Appl. No. 15/409,851, filed Jan. 19, 2017 (115 pages).
Brodsky et al., "Tamper-Respondent Assemblies with Enclosure-to-Board Protection", U.S. Appl. No. 15/423,833, filed Feb. 3, 2017 (54 pages).
Simek, Bob, "Tamper Restrictive Thermal Ventilation System for Enclosures Requiring Ventilation and Physical Security", IBM Publication No. IPCOM000008607D, Mar. 1, 1998 (2 pages).
Saran et al., "Fabrication and Characterization of Thin Films of Single-Walled Carbon Nanotube Bundles on Flexible Plastic Substrates", Journal of the American Chemical Society, vol. 126, No. 14 (Mar. 23, 2004) (pp. 4462-4463).
Khanna P.K. et al., "Studies on Three-Dimensional Moulding, Bonding and Assembling of Low-Temperature-Cofired Ceramics MEMS and MST Applications." Materials Chemistry and Physics, vol. 89, No. 1 (2005) (pp. 72-79).
Loher et al., "Highly Integrated Flexible Electronic Circuits and Modules", 3rd International IEEE on Microsystems, Packaging, Assembly & Circuits Technology Conference (Oct. 22-24, 2008) (Abstract Only) (1 page).
Drimer et al., "Thinking Inside the Box: System-Level Failures of Tamper Proofing", 2008 IEEE Symposium on Security and Privacy, (Feb. 2008) (pp. 281-295).
Fisher et al., "Embedded Venting System", U.S. Appl. No. 14/797,232, filed Jul. 13, 2015 (35 pages).
Isaacs et al., "Electronic Package with Heat Transfer Element(s)", U.S. Appl. No. 14/637,501, filed Mar. 4, 2015 (30 pages).
Isaacs et al., "Electronic Package with Heat Transfer Element(s)", U.S. Appl. No. 14/846,897, filed Sep. 7, 2015 (27 pages).
Dangler et al., "Tamper-Respondent Sensors with Formed Flexible Layer(s)", U.S. Appl. No. 14/865,551, filed Sep. 25, 2015 (113 pages).
Brodsky et al., "Overlapping, Discrete Tamper-Respondent Sensors", U.S. Appl. No. 14/865,572, filed Sep. 25, 2015 (114 pages).
Danger et al., "Tamper-Respondent Assemblies with Region(s) of Increased Susceptibility to Damage", U.S. Appl. No. 14/865,591, filed Sep. 25, 2015 (114 pages).
Brodsky et al., "Circuit Boards and Electronic Packages with Embedded Tamper-Respondent Sensor", U.S. Appl. No. 14/865,610, filed Sep. 25, 2015 (43 pages).
Brodsky et al, "Tamper-Respondent Assemblies", U.S. Appl. No. 14/865,632, filed Sep. 25, 2015 (115 pages).
Brodksky et al., "Enclosure with Inner Tamper-Respondent Sensor(s)", U.S. Appl. No. 14/865,651, filed Sep. 25, 2015 (115 pages).
Fisher et al., "Enclosure with Inner Tamper-Respondent Sensor(s) and Physical Security Element(s)", U.S. Appl. No. 14/865,686, filed Sep. 25, 2015 (114 pages).
Brodsky et al., "Tamper-Respondent Assemblies with Bond Protection", U.S. Appl. No. 14/865,708, filed Sep. 25, 2015 (113 pages).
Brodsky et al., "Circuit Layouts of Tamper-Respondent Sensors", U.S. Appl. No. 14/886,179, filed Oct. 19, 2015 (113 pages).
Isaacs, Phillip Duane, "Tamper-Respondent Assembly with Protective Wrap(s) Over Tamper-Respondent Sensor(s)", U.S. Appl. No. 14/918,691, filed Oct. 21, 2015 (40 pages).
Brodsky et al., "Tamper-Respondent Assemblies with Bond Protection", U.S. Appl. No. 14/941,860, filed Nov. 16, 2015 (108 pages).
Fisher et al., "Enclosure with Inner Tamper-Respondent Sensor(s) and Physical Security Element(s)", U.S. Appl. No. 14/941,872, filed Nov. 16, 2015 (109 pages).
Brodsky et al, "Tamper-Respondent Assemblies", U.S. Appl. No. 14/941,887, filed Nov. 16, 2015 (109 pages).
Brodsky et al., "Circuit Boards and Electronic Packages with Embedded Tamper-Respondent Sensors", U.S. Appl. No. 14/941,908, filed Nov. 16, 2015 (41 pages).
Fisher et al., "List of IBM Patents and Patent Applications Treated as Related", U.S. Appl. No. 14/955,283, filed Dec. 1, 2015, dated Dec. 22, 2015 (2 pages).
Fisher et al., "Applying Pressure to Adhesive Using CTE Mismatch Between Components", U.S. Appl. No. 14/963,681, filed Dec. 9, 2015 (68 pages).
Brodsky et al., "Tamper-Respondent Assemblies with Enclosure-to-Board Protection", U.S. Appl. No. 14/974,036, filed Dec. 18, 2015 (55 pages).

* cited by examiner

TAMPER-RESPONDENT ASSEMBLY WITH VENT STRUCTURE

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

SUMMARY

Provided herein, in one or more aspects, is a tamper-respondent assembly which includes: an electronic enclosure to enclose, at least in part, at least one electronic component to be protected, the electronic enclosure comprising an inner surface and an air vent; a tamper-respondent electronic circuit structure comprising a tamper-respondent sensor covering, at least in part, the inner surface of the electronic enclosure, and defining, at least in part, a secure volume about the at least one electronic component; and a vent structure comprising at least one air passage coupling in fluid communication the secure volume and the air vent of the electronic enclosure to allow air pressure within the secure volume to equalize with air pressure external to the tamper-respondent assembly.

In another aspect, an electronic package is provided which includes at least one electronic component, and a tamper-respondent assembly to protect the at least one electronic component. The tamper-respondent assembly includes: an electronic enclosure enclosing, at least in part, the at least one electronic component, the electronic enclosure comprising an inner surface and an air vent; a tamper-respondent electronic circuit structure comprising a tamper-respondent sensor covering, at least in part, the inner surface of the electronic enclosure, and defining, at least in part, a secure volume about the at least one electronic component; and a vent structure comprising at least one air passage coupling in fluid communication the secure volume and the air vent of the electronic enclosure to allow air pressure within the secure volume to equalize with air pressure external to the tamper-respondent assembly.

In a further aspect, a fabrication method is provided which includes fabricating a tamper-respondent assembly. The fabricating of the tamper-respondent assembly includes: providing an electronic enclosure to enclose, at least in part, at least one electronic component to be protected, the electronic enclosure comprising an inner surface and an air vent; providing a tamper-respondent electronic circuit structure comprising a tamper-respondent sensor covering, at least in part, the inner surface of the electronic enclosure, and defining, at least in part, a secure volume about the at least one electronic component; and providing a vent structure comprising at least one air passage coupling in fluid communication the secure volume and the air vent of the electronic enclosure to allow air pressure within the secure volume to equalize with air pressure external to the tamper-respondent assembly.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for establishing a secure volume about an electronic component or electronic assembly to be protected.

Figure 1:
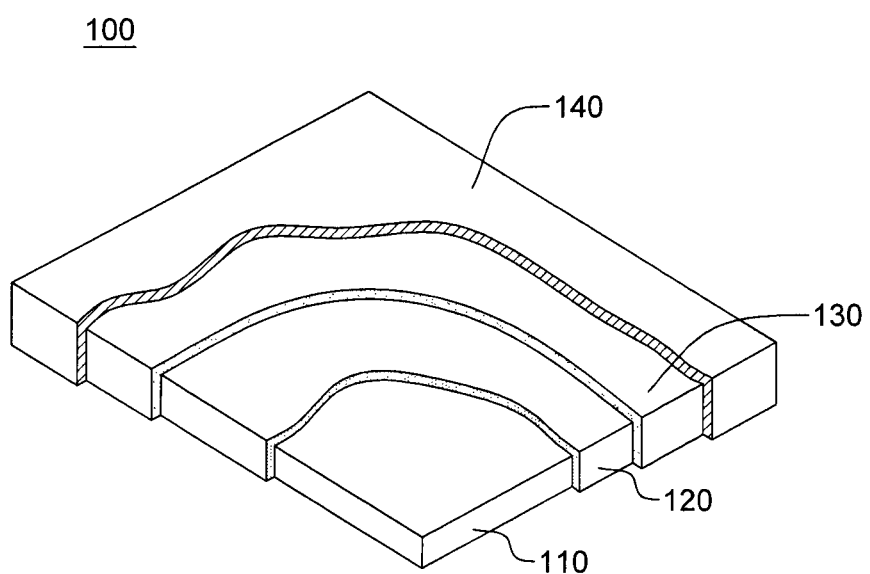
FIG. 1 is a partial cut-away of one embodiment of a tamper-proof electronic package which may incorporate a tamper-respondent electronic circuit structure, in accordance with one or more aspects of the present invention.

Reference is first made to FIG. 1 of the drawings, which illustrates one embodiment of an electronic assembly package 100 configured as a tamper-proof electronic assembly package for purposes of discussion. In the depicted embodiment, an electronic assembly enclosure 110 is provided containing, for instance, an electronic assembly, which in one embodiment may include a plurality of electronic components, such as an encryption and/or decryption module and associated memory. The encryption and/or decryption module may comprise security-sensitive information with, for instance, access to the information stored in the module requiring use of a variable key, and with the nature of the key being stored in the associated memory within the enclosure.

In one or more implementations, a tamper-proof electronic package such as depicted is configured or arranged to detect attempts to tamper-with or penetrate into electronic assembly enclosure 110. Accordingly, electronic assembly enclosure 110 also includes, for instance, a monitor circuit which, if tampering is detected, activates an erase circuit to erase information stored within the associated memory, as well as the encryption and/or decryption module within the communications card. These components may be mounted on, and interconnected by, a multilayer circuit board, such as a printed circuit board or other multilayer substrate, and be internally or externally powered via a power supply provided within the electronic assembly enclosure.

In the embodiment illustrated, and as one example only, electronic assembly enclosure 110 may be surrounded by a tamper-respondent sensor 120, an encapsulant 130, and an outer, thermally conductive enclosure 140. In one or more implementations, tamper-respondent sensor 120 may include a tamper-respondent laminate that is folded around electronic assembly enclosure 110, and encapsulant 130 may be provided in the form of a molding. Tamper-respondent sensor 120 may include various detection layers, which are monitored through, for instance, a ribbon cable by the enclosure monitor, against sudden violent attempts to penetrate enclosure 110 and damage the enclosure monitor or erase circuit, before information can be erased from the encryption module. The tamper-respondent sensor may be, for example, any such article commercially available or described in various publications and issued patents, or any enhanced article such as disclosed herein.

By way of example, tamper-respondent sensor 120 may be formed as a tamper-respondent laminate comprising a number of separate layers with, for instance, an outermost lamination-respondent layer including a matrix of, for example, diagonally-extending or sinusoidally-extending, conductive or semi-conductive lines printed onto a regular, thin insulating film. The matrix of lines forms a number of continuous conductors which would be broken if attempts are made to penetrate the film. The lines may be formed, for instance, by printing carbon-loaded Polymer Thick Film (PTF) ink onto the film and selectively connecting the lines on each side, by conductive vias, near the edges of the film. Connections between the lines and an enclosure monitor of the communications card may be provided via, for instance, one or more ribbon cables. The ribbon cable itself may be formed of lines of conductive ink printed onto an extension of the film, if desired. Connections between the matrix and the ribbon cable may be made via connectors formed on one edge of the film. As noted, the laminate may be wrapped around the electronic assembly enclosure to define the tamper-respondent sensor 120 surrounding enclosure 110.

In one or more implementations, the various elements of the laminate may be adhered together and wrapped around enclosure 110, in a similar manner to gift-wrapping a parcel, to define the tamper-respondent sensor shape 120. The assembly may be placed in a mold which is then filled with, for instance, cold-pour polyurethane, and the polyurethane may be cured and hardened to form an encapsulant 130. The encapsulant may, in one or more embodiments, completely surround the tamper-respondent sensor 120 and enclosure 110, and thus form a complete environmental seal, protecting the interior of the enclosure. The hardened polyurethane is resilient and increases robustness of the electronic package in normal use. Outer, thermally conductive enclosure 140 may optionally be provided over encapsulant 130 to, for instance, provide further structural rigidity to the electronic package.

Note that, as an enhancement, within a sealed electronic package, such as the tamper-proof electronic package depicted in FIG. 1 and described above, structures and methods for facilitating heat transfer from one or more electronic components disposed therein outwards through the enclosure and any other layers of the electronic package may be provided.

Figure 2:
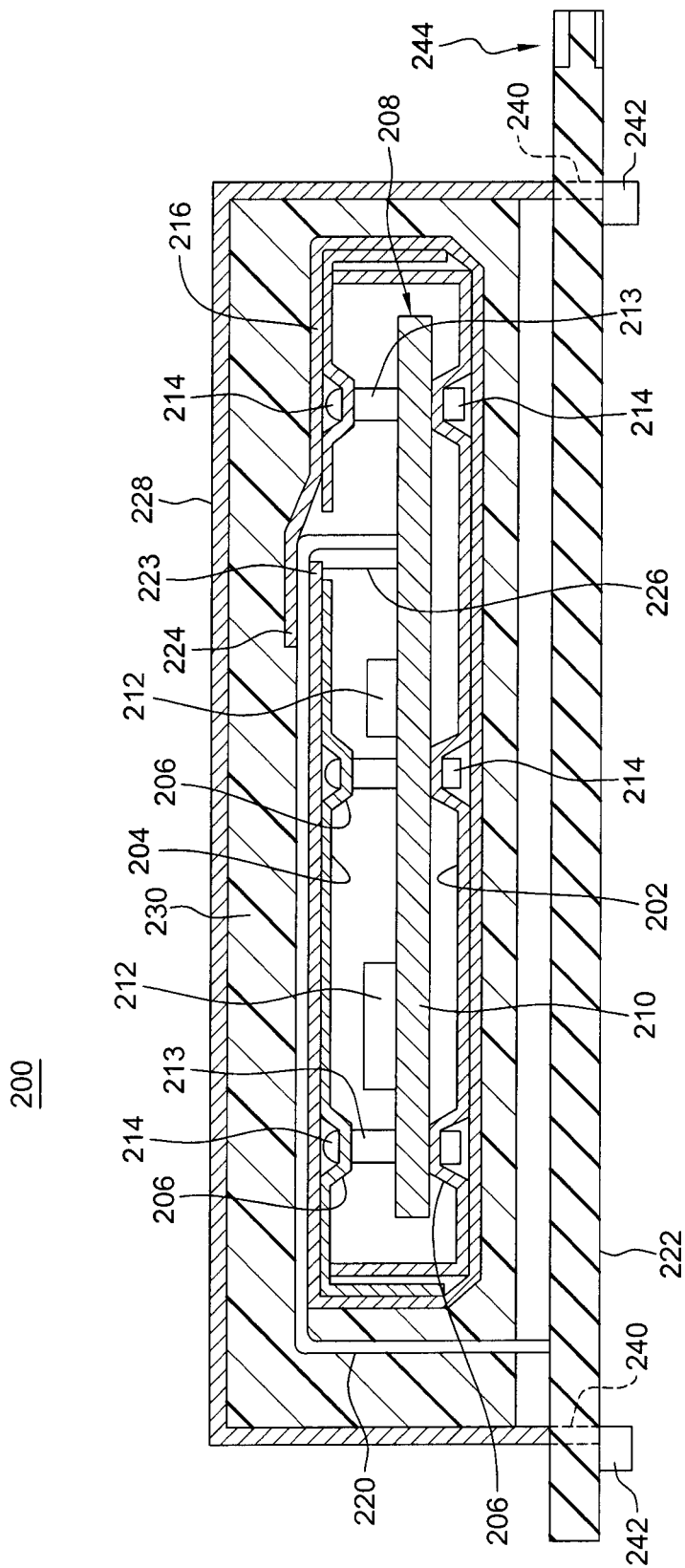
FIG. 2 is a cross-sectional elevational view of one embodiment of a prior art, tamper-proof electronic package comprising an electronic circuit.

FIG. 2 depicts in detail one embodiment of a typical tamper-proof electronic package 200. Electronic package 200 is defined by, for instance, a base metal shell 202 and a top metal shell 204. Outer surfaces of base metal shell 202 and top metal shell 204 may be provided with standoffs 206, with an electronic assembly 208 resting on standoffs 206 defined in base metal shell 202. Electronic assembly 208 may include, for instance, a printed circuit board 210 with electronic components 212 that are electrically connected via conductors (not shown) defined within or on printed circuit board 210.

Hollow spacers 213 may be placed below dimples 206 in top metal shell 204, and rivets 214 provided, extending through openings in dimples 206, through hollow spacers 213 and through openings in printed circuit board 210 to base metal shell 202 in order to fixedly secure electronic assembly 208 within the enclosure formed by base and top metal shells 202, 204. A security mesh or tamper-respondent sensor 216 is wrapped around the top, base, and four sides of the enclosure formed by base and top metal shells 202, 204. As illustrated, in one or more embodiments, top metal shell 204 may have an opening through which a bus 220 extends. One end of bus 220 may be connected to conductors (not shown) on printed circuit board 210, and the other end may be connected to conductors (not shown) on a printed circuit board 222. As bus 220 passes through the opening, the bus extends between an inner edge region 223 of the security mesh 216 and an overlapping, outer edge region 224 of the security mesh 216. A group of wires 226 connect, in one embodiment, security mesh 216 to conductors on printed circuit board 210. Circuitry on printed circuit board 210 is responsive to a break or discontinuity in security sensor array 216, in which case, an alarm signal may be emitted on bus 220, and also encryption/decryption keys stored within electronic assembly 208 may be erased.

In one or more implementations, liquid polyurethane resin may be applied to security mesh 216 and cured. An outer, thermally conductive enclosure 228, such as a copper enclosure, may be filled with liquid polyurethane resin with the electronic assembly and inner enclosure and security mesh suspended within it. Upon curing the resin, the electronic assembly and inner enclosure and security mesh become embedded in a polyurethane block or encapsulant 230, as shown. The enclosure 228 is mounted on the printed circuit board 222, which can be accomplished using, for instance, legs 240 which extend through slots in printed circuit board 222 and terminate in flanges 242, which are then bent out of alignment with the slots. Bus 220 may be connected, by way of printed circuit board 222 to connectors 244 located along, for instance, one edge of printed circuit board 222.

When considering tamper-proof packaging, the electronic package needs to maintain defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-2 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs). Security Level 4 cryptographic modules are useful for operation in physically unprotected environments. Security Level 4 also protects a cryptographic module against a security compromise due to environmental conditions or fluctuations outside of the module's normal operating ranges for voltages and temperature. Intentional excursions beyond the normal operating ranges may be used by an attacker to thwart the cryptographic module's defenses. The cryptographic module is required to either include specialized environmental protection features designed to detect fluctuations and zeroize critical security parameters, or to undergo rigorous environmental failure testing to provide reasonable assurance that the module will not be affected by fluctuations outside of the normal operating range in a manner that can compromise the security of the module.

To address the demands of ever-improving anti-intrusion technology, and the higher-performance encryption/decryption functions being provided, enhancements to the tamper-proof, tamper-evident packaging for the electronic assembly at issue are desired. Numerous enhancements are described hereinbelow to, for instance, tamper-respondent assemblies and tamper-respondent sensors. Note that the numerous inventive aspects described herein may be used singly, or in any desired combination. Additionally, in one or more implementations, the enhancements to tamper-proof electronic packaging described herein may be provided to work within defined space limitations for existing packages. For instance, one or more of the concepts described may be configured to work with peripheral component interconnect express (PCIe) size limits, and the limitations resulting from being capsulated in, for instance, an insulating encapsulant.

Thus, disclosed hereinbelow with reference to FIGS. 3-13B are various approaches and/or enhancements to creating a secure volume for accommodating one or more electronic components, such as one or more encryption and/or decryption modules and associated components of a communications card or other electronic assembly.

Figure 3:
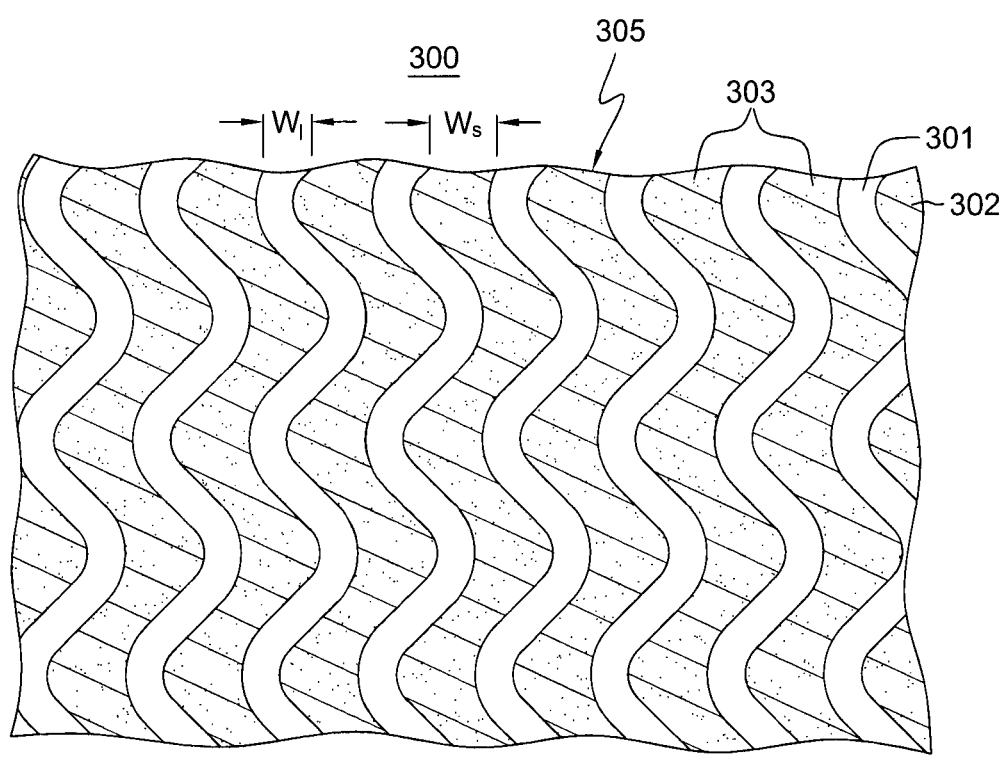
FIG. 3 depicts one embodiment of a tamper-respondent sensor comprising one or more flexible layers and circuit lines forming at least one tamper-detect network, in accordance with one or more aspects of the present invention.

FIG. 3 depicts a portion of one embodiment of a tamper-respondent layer 305 (or laser and pierce-respondent layer) of a tamper-respondent sensor 300 or security sensor, such as discussed herein. In FIG. 3, the tamper-respondent layer 305 includes circuit lines or traces 301 provided on one or both opposite sides of a flexible layer 302, which in one or more embodiments, may be a flexible insulating layer or film. FIG. 3 illustrates circuit lines 301 on, for instance, one side of flexible layer 302, with the traces on the opposite side of the film being, for instance, the same pattern, but (in one or more embodiments) offset to lie directly below spaces 303, between circuit lines 301. As described below, the circuit lines on one side of the flexible layer may be of a line width $W_l$ and have a pitch or line-to-line spacing $W_s$ such that piercing of the layer 305 at any point results in damage to at least one of the circuit lines traces 301. In one or more implementations, the circuit lines may be electrically connected in-series or parallel to define one or more conductors which may be electrically connected in a network to an enclosure monitor, which monitors the resistance of the lines, as described herein. Detection of an increase, or other change, in resistance, caused by cutting or damaging one of the traces, will cause information within the encryption and/or decryption module to be erased. Providing conductive lines 301 in a pattern, such as a sinusoidal pattern, may advantageously make it more difficult to breach tamper-respondent layer 305 without detection. Note, in this regard, that conductive lines 301 could be provided in any desired pattern. For instance, in an alternate implementation, conductive lines 301 could be provided as parallel, straight conductive lines, if desired, and the pattern or orientation of the pattern may vary between sides of a layer, and/or between layers.

As noted, as intrusion technology continues to evolve, anti-intrusion technology needs to continue to improve to stay ahead. In one or more implementations, the above-summarized tamper-respondent sensor 300 of FIG. 3 may be disposed over an outer surface of an electronic enclosure, such as an electronic enclosure described above in connection with FIGS. 1 & 2. Alternatively, as described further herein, the tamper-respondent sensor may cover or line an inner surface of an electronic enclosure to provide a secure volume about at least one electronic component to be protected. Numerous enhancements to the tamper-respondent sensor itself are described below.

In one or more aspects, disclosed herein is a tamper-respondent sensor 300 with circuit lines 301 having reduced line widths $W_l$ of, for instance, 200 µm, or less, such as less than or equal to 100 µm, or even more particularly, in the range of 30-70 µm. This is contrasted with conventional trace widths, which are typically on the order of 350 µm or larger. Commensurate with reducing the circuit line width $W_l$, line-to-line spacing width $W_s$ 303 is also reduced to less than or equal to 200 µm, such as less than or equal to 100 µm, or for instance, in a range of 30-70 µm. Advantageously, by reducing the line width $W_l$ and line-to-line spacing $W_s$ of circuit lines 301 within tamper-respondent sensor 300, the circuit line width and pitch is on the same order of magnitude as the smallest intrusion instruments currently available, and therefore, any intrusion attempt will necessarily remove a sufficient amount of a circuit line(s) to cause resistance to change, and thereby the tamper intrusion to be detected. Note that, by making the circuit line width of the smaller dimensions disclosed herein, any cutting or damage to the smaller-dimensioned circuit line will also be more likely to be detected, that is, due to a greater change in resistance. For instance, if an intrusion attempt cuts a 100 µm width line, it is more likely to reduce the line width sufficiently to detect the intrusion by a change in resistance. A change in a narrower line width is more likely to result in a detectable change in resistance, compared with, for instance, a 50% reduction in a more conventional line width of 350 µm to, for instance, 175 µm. The smaller the conductive circuit line width becomes, the more likely that a tampering of that line will be detected.

Note also that a variety of materials may advantageously be employed to form the circuit lines. For instance, the circuit lines may be formed of a conductive ink (such as a carbon-loaded conductive ink) printed onto one or both opposite sides of one or more of the flexible layers 302 in a stack of such layers. Alternatively, a metal or metal alloy could be used to form the circuit lines, such as copper, silver, intrinsically conductive polymers, carbon ink, or nickel-phosphorus (NiP), or Omega-Ply®, offered by Omega Technologies, Inc. of Culver City, Calif. (USA), or Ticer™ offered by Ticer Technologies, Chandler, Ariz. (USA). Note that the process employed to form the fine circuit lines or traces on the order described herein is dependent, in part, on the choice of material used for the circuit lines. For instance, if copper circuit lines are being fabricated, then additive processing, such as plating up copper traces, or subtractive processing, such as etching away unwanted copper between trace lines, may be employed. By way of further example, if conductive ink is employed as the circuit line material, fine circuit lines on the order disclosed herein can be achieved by focusing on the rheological properties of the conductive ink formulation. Further, rather than simple pneumatics of pushing conductive ink through an aperture in a stencil with a squeegee, the screen emulsion may be characterized as very thin (for instance, 150 to 200 µm), and a squeegee angle may be used such that the ink is sheared to achieve conductive ink breakaway rather than pumping the conductive ink through the screen apertures. Note that the screen for fine line width printing such as described herein may have the following characteristics in one specific embodiment: a fine polyester thread for both warp and weave on the order of 75 micrometers; a thread count between 250-320 threads per inch; a mesh thickness of, for instance, 150 micrometers; an open area between threads that is at least 1.5× to 2.0× the conductive ink particle size; and to maintain dimensional stability of the print, the screen snap-off is kept to a minimum due the screen strain during squeegee passage.

In one or more implementations, circuit lines 301 of tamper-respondent sensor 300 are electrically connected to define one or more resistive networks. Further, the circuit lines may include one or more resistive circuit lines by selecting the line material, line width $W_l$ and line length $L_l$, to provide a desired resistance per line. As one example, a "resistive circuit line" as used herein may comprise a line with 1000 ohms resistance or greater, end-to-end. In one specific example, a circuit line width of 50 µm, with a circuit line thickness of 10 µm may be used, with the line length $L_l$ and material selected to achieve the desired resistance. At the dimensions described, good electrical conductors such as copper or silver may also be employed and still form a resistive network due to the fine dimensions noted. Alternatively, materials such as conductive ink or the above-noted Omega-Ply® or Ticer™ may be used to define resistive circuit lines.

In a further aspect, the flexible layer 302 itself may be further reduced in thickness from a typical polyester layer by selecting a crystalline polymer to form the flexible layer or substrate. By way of example, the crystalline polymer could comprise polyvinylidene difluoride (PVDF), or Kapton, or other crystalline polymer material. Advantageously, use of a crystalline polymer as the substrate film may reduce thickness of the flexible layer 302 to, for instance, 2 mils thick from a more conventional amorphous polyester layer of, for instance, 5-6 mils. A crystalline polymer can be made much thinner, while still maintaining structural integrity of the flexible substrate, which advantageously allows for far more folding, and greater reliability of the sensor after folding. Note that the radius of any fold or curvature of the sensor is necessarily constrained by the thickness of the layers comprising the sensor. Thus, by reducing the flexible layer thickness to, for instance, 2 mils, then in a four tamper-respondent layer stack, the stack thickness can be reduced from, for instance, 20 mils in the case of a typical polyester film, to 10 mils or less with the use of crystalline polymer films.

Figure 4A:
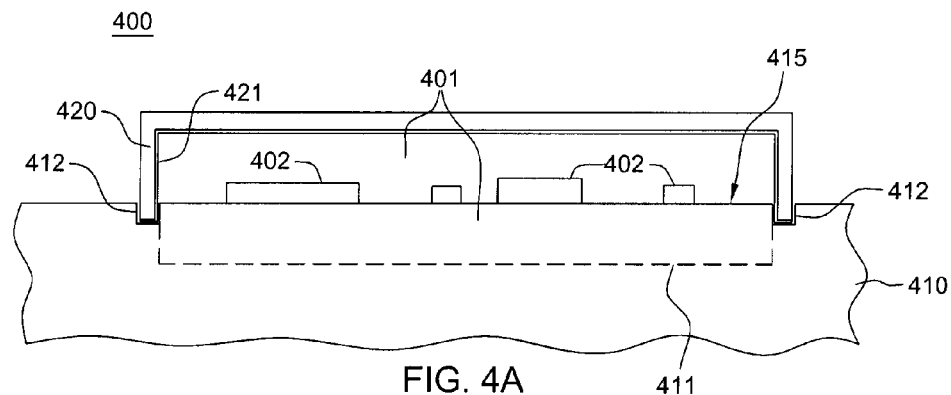
FIG. 4A is a cross-sectional elevational view of one embodiment of a tamper-respondent assembly, or tamper-proof electronic package, which includes (in part) a tamper-respondent sensor embedded within a multilayer circuit board, in accordance with one or more aspects of the present invention.
Figure 4B:
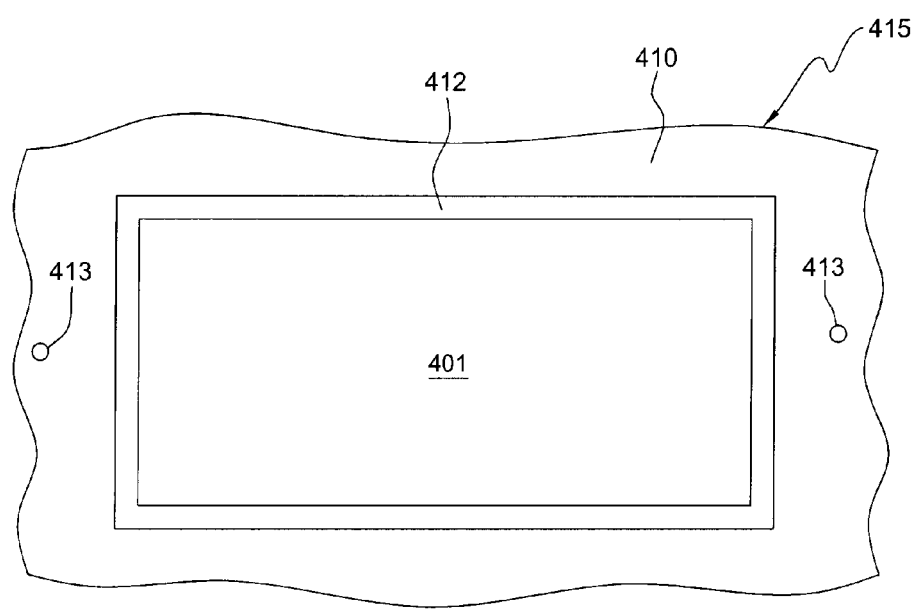
FIG. 4B is a top plan view of the multilayer circuit board of FIG. 4A, depicting one embodiment of the secure volume where defined, in part, within the multilayer circuit board, in accordance with one or more aspects of the present invention.

By way of further example, FIGS. 4A & 4B depict one embodiment of tamper-respondent assembly 400, or tamper-proof electronic package, which comprises an electronic circuit 415 to be protected, in accordance with one or more further aspects of the present invention.

Referring collectively to FIGS. 4A & 4B, electronic circuit 415 includes a multilayer circuit board 410 which has an embedded tamper-respondent sensor 411 therein that facilitates defining, in part, a secure volume 401 associated with multilayer circuit board 410 that extends into multilayer circuit board 410. In particular, in the embodiment of FIGS. 4A & 4B, secure volume 401 exists partially within multilayer circuit board 410, and partially above multilayer circuit board 410. One or more electronic components 402 are mounted to multilayer circuit board 410 within secure volume 401 and may comprise, for instance, one or more encryption modules and/or decryption modules, and associated components, with the tamper-proof electronic package comprising, in one or more embodiments, a communications card of a computer system.

Tamper-proof electronic package 400 further includes an enclosure 420, such as a pedestal-type enclosure, mounted to multilayer circuit board 810 within, for instance, a continuous groove (or trench) 412 formed within an upper surface of multilayer circuit board 410. In one or more embodiments, enclosure 420 may comprise a thermally conductive material and operate as a heatsink for facilitating cooling of the one or more electronic components 402 within the secure volume. A security mesh or tamper-respondent sensor 421, such as the above-described tamper-respondent sensors of FIG. 3, may be associated with enclosure 420, for example, wrapping around the inner surface of enclosure 420 to facilitate defining, in combination with tamper-respondent sensor 411 embedded within multilayer circuit board 410, secure volume 401. In one or more implementations, tamper-respondent sensor 421 extends down into continuous groove 412 in multilayer circuit board 410 and may, for instance, even wrap partially or fully around the lower edge of enclosure 420 within continuous groove 412 to provide enhanced tamper-detection where enclosure 420 couples to multilayer circuit board 410. In one or more implementations, enclosure 420 may be securely affixed to multilayer circuit board 410 using, for instance, a bonding material such as an epoxy or other adhesive.

As depicted in FIG. 4B, one or more external circuit connection vias 413 may be provided within multilayer circuit board 410 for electrically connecting to the one or more electronic components 402 (FIG. 4A) within secure volume 401. These one or more external circuit connection vias 413 may electrically connect to one or more external signal lines or planes (not shown) embedded within multilayer circuit board 410 and extending, for instance, into a secure base region of (or below) secure volume 401, as explained further below. Electrical connections to and from secure volume 401 may be provided by coupling to such external signal lines or planes within the multilayer circuit board 410.

As noted with reference to FIGS. 4A & 4B, secure volume 401 defined in association with multilayer circuit board 410 may be sized to house electronic components 402 to be protected, and be constructed to extend into multilayer circuit board 410. In one or more implementations, multilayer circuit board 410 includes electrical interconnect within the secure volume 401 defined in the board, for instance, for electrically connecting the multiple tamper-respondent layers of the embedded tamper-respondent sensor 411 to associated monitor circuitry also disposed within secure volume 401, along with, for instance, one or more daughter cards, such as memory DIMMs, PCIe cards, processor cards, etc.

Note that the embodiment depicted in FIGS. 4A & 4B is presented by way of example only. In one or more other implementations, the electronic circuit may comprise multiple multilayer circuit boards, each with a tamper-respondent sensor embedded within the multilayer circuit board with an appropriate connector, located within a secure volume defined between two adjacent multilayer circuit boards, interconnecting selected wiring of the multilayer circuit boards. In such an implementation, the overlying multilayer circuit board could be hollowed out to accommodate, for instance, the connector and/or one or more other electronic components between the multilayer circuit boards. In addition, other configurations of enclosure 420, and/or other approaches to coupling enclosure 420 and multilayer circuit board 410 may be employed.

Figure 5:
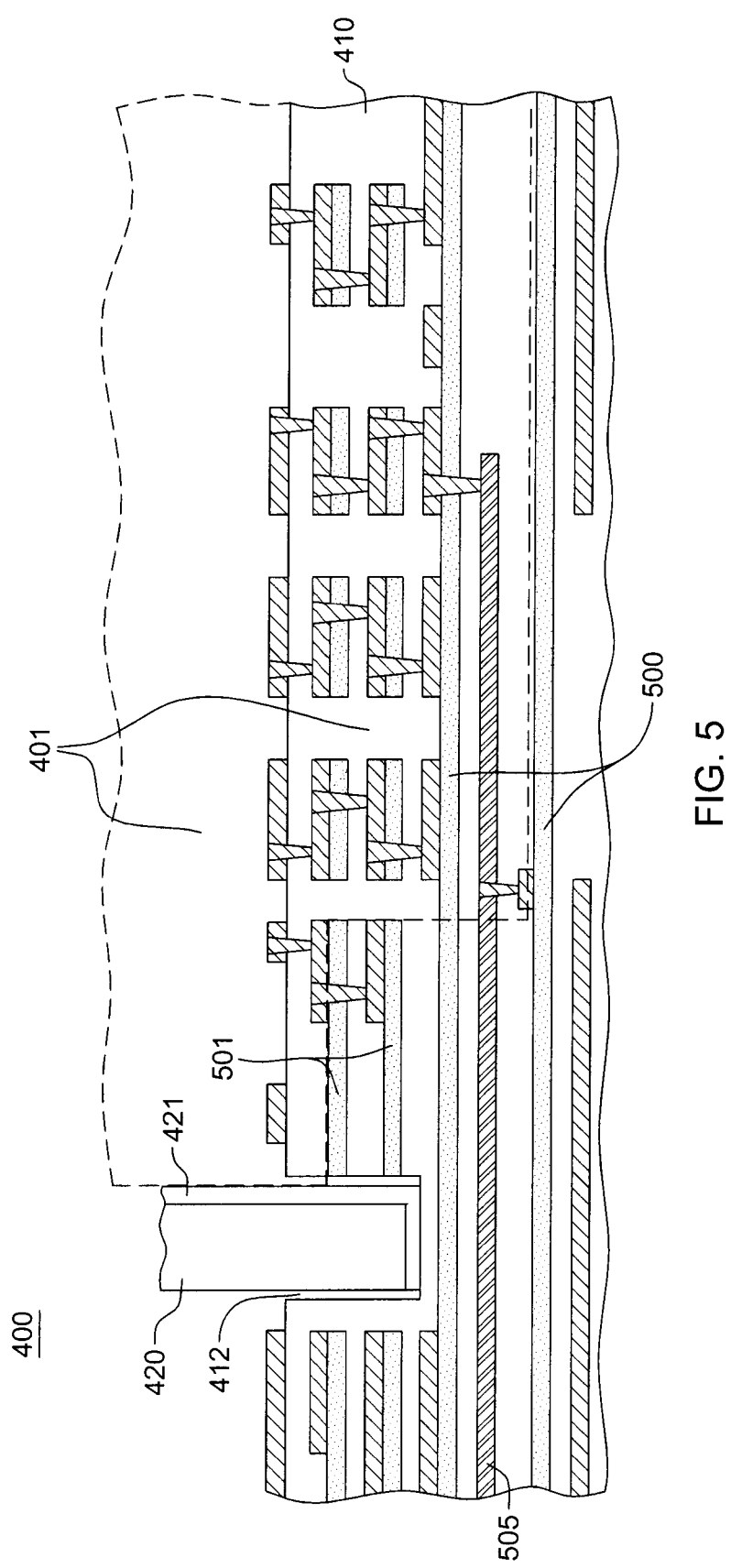
FIG. 5 is a partial cross-sectional elevational view of a tamper-respondent assembly comprising (in part) a multilayer circuit board and embedded tamper-respondent sensor, in accordance with one or more aspects of the present invention.

By way of further example, FIG. 5 depicts a partial cross-sectional elevational view of one embodiment of multilayer circuit board 410 and enclosure 420. In this configuration, the embedded tamper-respondent sensor includes multiple tamper-respondent layers including, by way of example, at least one tamper-respondent mat (or base) layer 500, and at least one tamper-respondent frame 501. In the example depicted, two tamper-respondent mat layers 500 and two tamper-respondent frame 501 are illustrated, by way of example only. The lower-most tamper-respondent mat layer 500 may be a continuous sense or detect layer extending completely below the secure volume being defined within multilayer circuit board 510. One or both tamper-respondent mat layers 500 below secure volume 401 may be partitioned into multiple circuit zones, as discussed further below. Within each tamper-respondent mat layer, or more particularly, within each circuit zone of each tamper-respondent mat layer, multiple circuits or conductive traces are provided in any desired configuration, such as the configuration described above in connection with FIG. 3. Further, the conductive traces within the tamper-respondent layers may be implemented as, for instance, a resistive layer which is difficult to attach shunt circuits to, as explained further below.

As illustrated, one or more external signal lines or planes 505 enter secure volume 501 between, in this embodiment, two tamper-respondent mat layers 500, and then electrically connect upwards into the secure volume 501 through one or more conductive vias, arranged in any desired location and pattern. In the configuration depicted, the one or more tamper-respondent frames 501 are disposed at least inside of the area defined by continuous groove 512 accommodating the base of enclosure 520. Together with security sensor 421 associated with enclosure 420, tamper-respondent frames 501 define secure volume 401 where extending, in part, into multilayer circuit board 410. With secure volume 401 defined, at least in part, within multilayer circuit board 410, the external signal line(s) 505 may be securely electrically connected to, for instance, the one or more electronic components 402 (FIG. 4A) mounted to multilayer circuit board 410 within secure volume 401. In addition, the secure volume 401 may accommodate electrical interconnection of the conductive traces of the multiple tamper-respondent layers, for instance, via appropriate monitor circuitry.

Added security may be provided by extending tamper-respondent mat layers 500 (and if desired, tamper-respondent frames 501) outward past continuous groove 412 accommodating enclosure 420. In this manner, a line of attack may be made more difficult at the interface between enclosure 420 and multilayer circuit board 410 since the attack would need to clear tamper-respondent mat layers 500, the bottom edge of tamper-respondent sensor 421 associated with enclosure 420, as well as the tamper-respondent frames 501 of the embedded tamper-respondent sensor.

Variations on the multilayer circuit board 410 of FIG. 4A are possible. For instance, in one embodiment, the embedded tamper-respondent sensor may include multiple tamper-respondent mat layers 500 and multiple tamper-respondent frames 501, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, would be facilitated.

Note also that, once within the secure volume is defined within multilayer circuit board 410, conductive vias within the secure volume between layers of multilayer circuit board 410 may be either aligned, or offset, as desired, dependent upon the implementation. Alignment of conductive vias may facilitate, for instance, providing a shortest connection path, while offsetting conductive vias between layers may further enhance security of the tamper-proof electronic package by making an attack into the secure volume through or around one or more tamper-respondent layers of the multiple tamper-respondent layers more difficult.

The tamper-respondent layers of the embedded tamper-respondent sensor formed within the multilayer circuit board of the electronic circuit or electronic package may include multiple conductive traces or lines formed between, for instance, respective sets of input and output contacts or vias at the trace termination points. Any number of conductive traces or circuits may be employed in defining a tamper-respondent layer or a tamper-respondent circuit zone within a tamper-respondent layer. For instance, 4, 6, 8, etc., conductive traces may be formed in parallel (or otherwise) within a given tamper-respondent layer or circuit zone between the respective sets of input and output contacts to those conductive traces.

Figure 6:
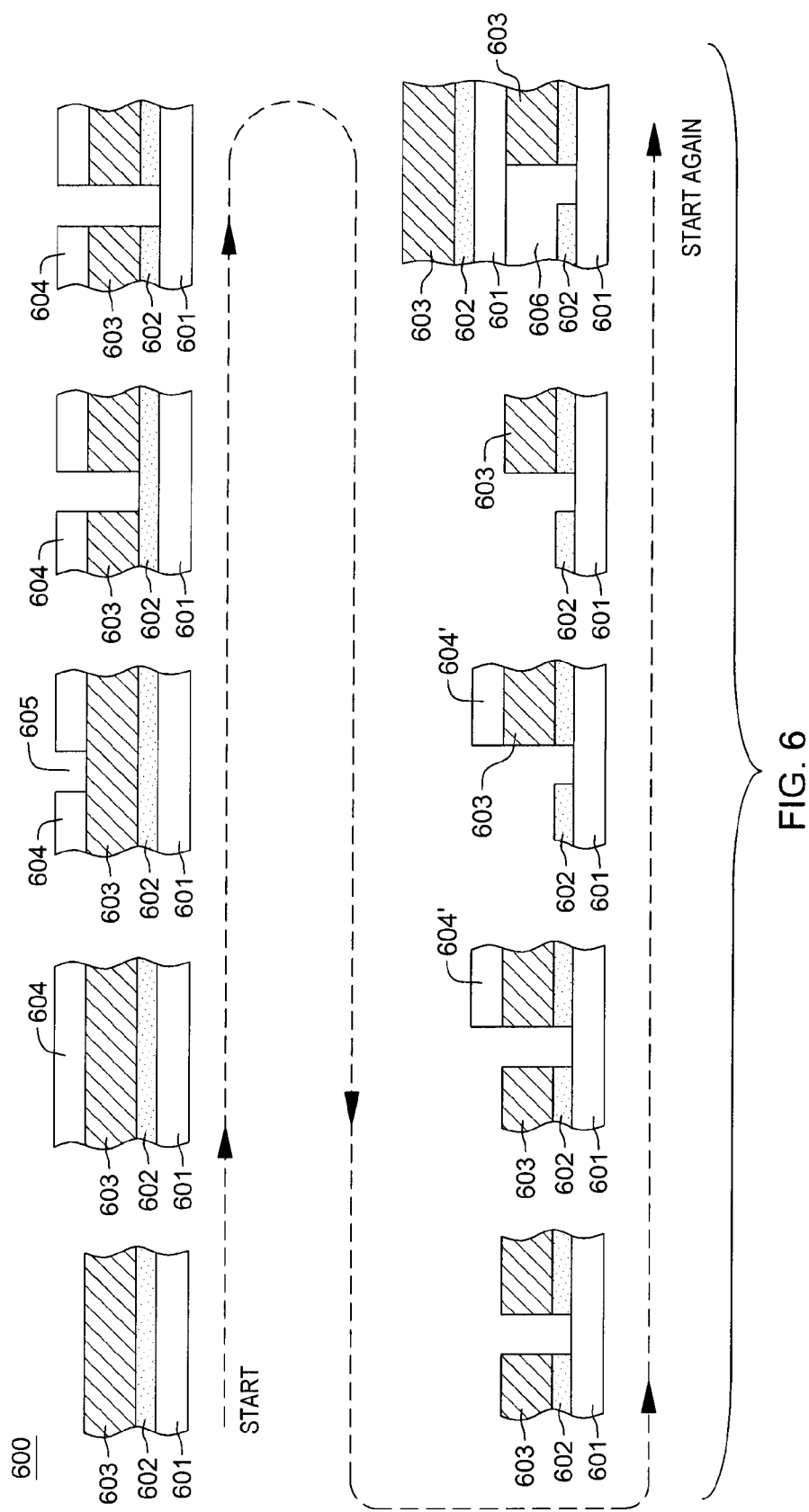
FIG. 6 depicts one embodiment of a process of fabricating a multilayer circuit board with an embedded tamper-respondent sensor, in accordance with one or more aspects of the present invention.

In one or more implementations, the multilayer circuit board may be a multilayer wiring board or printed circuit board formed, for instance, by building up the multiple layers of the board. FIG. 6 illustrates one embodiment for forming and patterning a tamper-respondent layer within such a multilayer circuit board.

As illustrated in FIG. 6, in one or more implementations, a tamper-respondent layer, such as a tamper-respondent mat layer or a tamper-respondent frame disclosed herein, may be formed by providing a material stack comprising, at least in part, a structural layer 601, such as a pre-preg (or pre-impregnated) material layer, a trace material layer 602 for use in defining the desired trace patterns, and an overlying conductive material layer 603, to be patterned to define conductive contacts or vias electrically connecting to the pattern of traces being formed within the trace material layer 602, for instance, at trace terminal points. In one or more implementations, the trace material layer 602 may comprise nickel phosphorous (NiP), and the overlying conductive layer 603 may comprise copper. Note that these materials are identified by way of example only, and that other trace and/or conductive materials may be used within the build-up 600.

A first photoresist 604 is provided over build-up 600, and patterned with one or more openings 605, through which the overlying conductive layer 603 may be etched. Depending on the materials employed, and the etch processes used, a second etch process may be desired to remove portions of trace material layer 602 to define the conductive traces of the subject tamper-respondent layer. First photoresist 1004 may then be removed, and a second photoresist 604' is provided over the conductive layer 603 features to remain, such as the input and output contacts. Exposed portions of conductive layer 603 are then etched, and the second photoresist 604' may be removed, with any opening in the layer being filled, for instance, with an adhesive (or pre-preg) and a next build-up layer is provided, as shown. Note that in this implementation, most of overlying conductive layer 603 is etched away, with only the conductive contacts or vias remaining where desired, for instance, at the terminal points of the traces formed within the layer by the patterning of the trace material layer 602. Note that any of a variety of materials may be employed to form the conductive lines or traces within a tamper-respondent layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which could be employed include OhmegaPly®, offered by Ohmega Technologies, Inc., of Culver City, Calif. (USA), or Ticer™, offered by Ticer Technologies of Chandler, Ariz. (USA).

The trace lines or circuits within all of the tamper-respondent layers, and in particular, the tamper-respondent circuit zones, of the embedded tamper-respondent sensor, along with the tamper-respondent sensor 421 (FIG. 4A), may be electrically connected into monitor or compare circuitry provided, for instance, within secure volume 401 (FIG. 4A) of multilayer circuit board 410. The monitor circuitry may include various bridge or compare circuits, and conventional printed wiring board electrical interconnect inside the secure volume 401, for instance, located within the secure volume defined by the tamper-respondent frames 501 (FIG. 5), and the tamper-respondent mat layers.

Note that advantageously, different tamper-respondent circuit zones on different tamper-respondent layers may be electrically interconnected into, for instance, the same comparator circuit, Wheatstone bridge, or similar monitor circuitry. Thus, any of a large number of interconnect configurations may be possible. For instance, if each of two tamper-respondent mat layers contains 30 tamper-respondent circuit zones, and each of two tamper-respondent frames contains 4 tamper-respondent circuit zones, then, for instance, the resultant 68 tamper-respondent circuit zones may be connected in any configuration within the secure volume to create the desired arrangement of circuit networks within the secure volume being monitored for changes in resistance or tampering. Note in this regard, that the power supply or battery for the tamper-respondent sensor may be located external to the secure volume, with the sensor being configured to trip and destroy any protected or critical data if the power supply or battery is tampered with.

Figure 7:
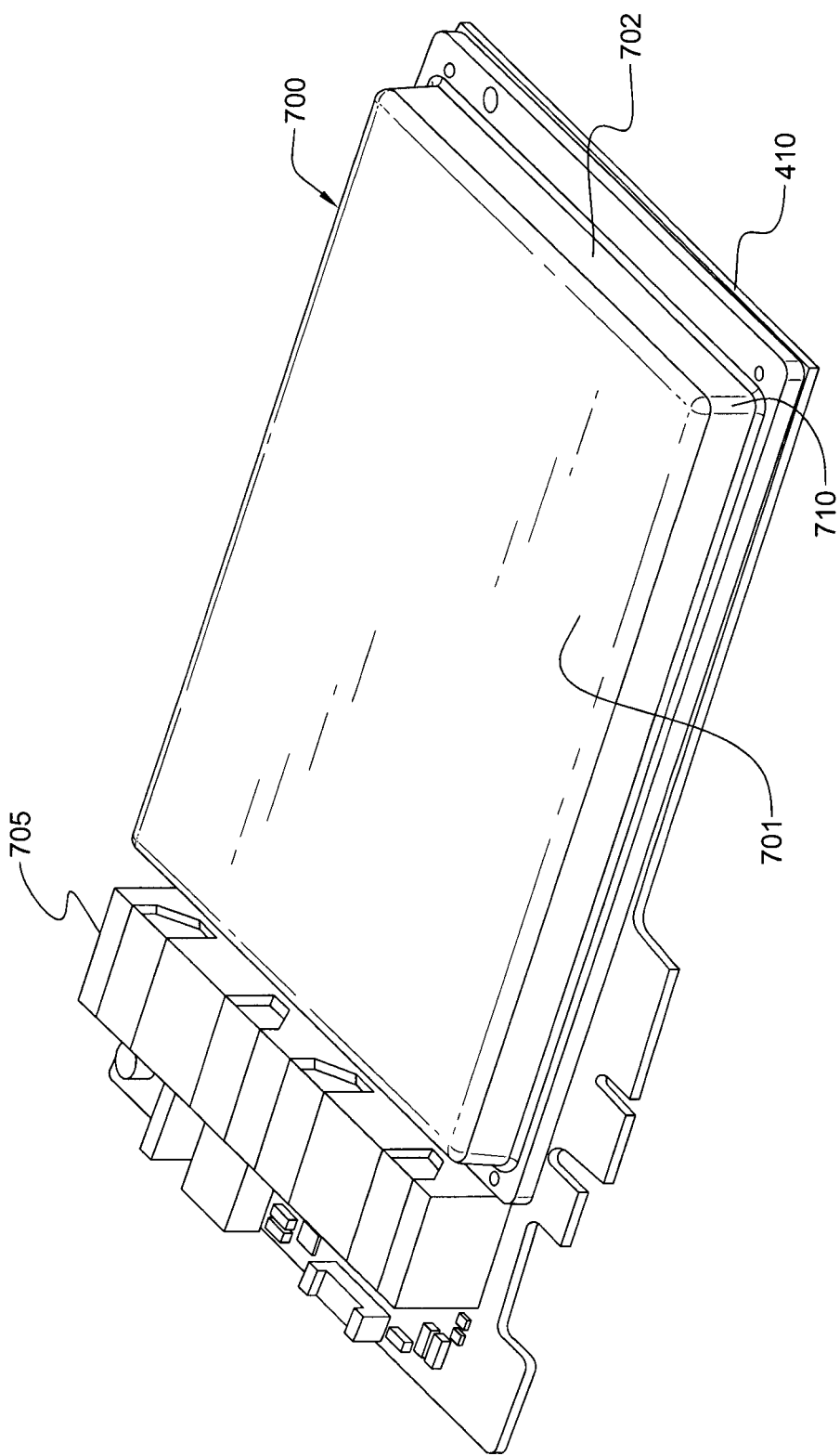
FIG. 7 is isometric view of one embodiment of a tamper-respondent assembly, or tamper-proof electronic package, which includes (in part) a multilayer circuit board with embedded tamper-respondent sensor, and a vent structure, in accordance with one or more aspects of the present invention.

By way of example, an isometric view of one embodiment of a tamper-respondent assembly, or tamper-proof electronic package is depicted in FIG. 7, wherein an electronic enclosure 700 is shown sealed to multilayer circuit board 410 to define a secure volume about one or more electronic components, as described herein. In the embodiment depicted, electronic enclosure 700 includes a main surface 701 and sidewall(s) 702 which include sidewall corners 710. An inner surface of electronic enclosure 700 would include an inner main surface, and an inner sidewall surface corresponding to main surface 701 and sidewall(s) 702, respectively, with the inner main surface and inner sidewall surfaces being covered, at least in part, by a tamper-respondent sensor such as described herein. A power supply 705 or battery for the tamper-respondent sensor is located, in this embodiment, external to the secure volume, with the sensor again being configured to trip and destroy any protected or critical data if the power supply or battery is tampered with. Electronic enclosure 700 may be adhered or mechanically affixed to multilayer circuit board 410, which as noted above, may include its own embedded tamper-respondent sensor layer(s).

As explained further below, in one or more implementations, the tamper-respondent assembly may incorporate or include an air path to air pressure within the secure volume of the assembly to equalize with air pressure external to the assembly. By way of example, an air vent may be provided through electronic enclosure 700, and this air vent may be in fluid communication with a vent structure disposed between the electronic enclosure and the multilayer circuit board. For instance, the vent structure may comprise a low profile vent structure sandwiched between overlapping regions of a tamper-respondent sensor covering an inner sidewall surface of the electronic enclosure. The vent structure includes at least one air passage coupling in fluid communication the secure volume defined by the assembly and the air vent in electronic enclosure 700. Note that in this context "in fluid communication" refers to air or gas communication being established between the secure volume provided by the tamper-respondent assembly, and the air vent through the electronic enclosure.

Figure 8A:
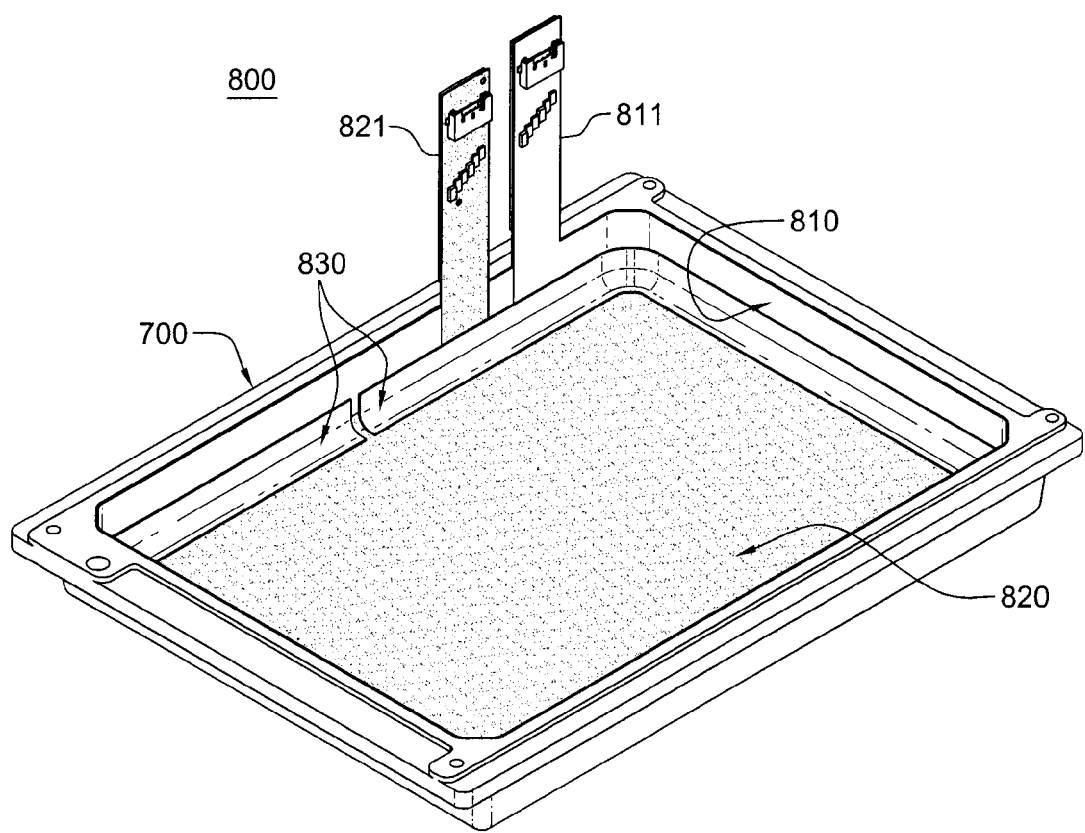
FIG. 8A depicts an underside, perspective view of one embodiment of a tamper-respondent assembly comprising an electronic enclosure and multiple tamper-respondent sensors, in accordance with one or more aspects of the present invention.
Figure 8B:
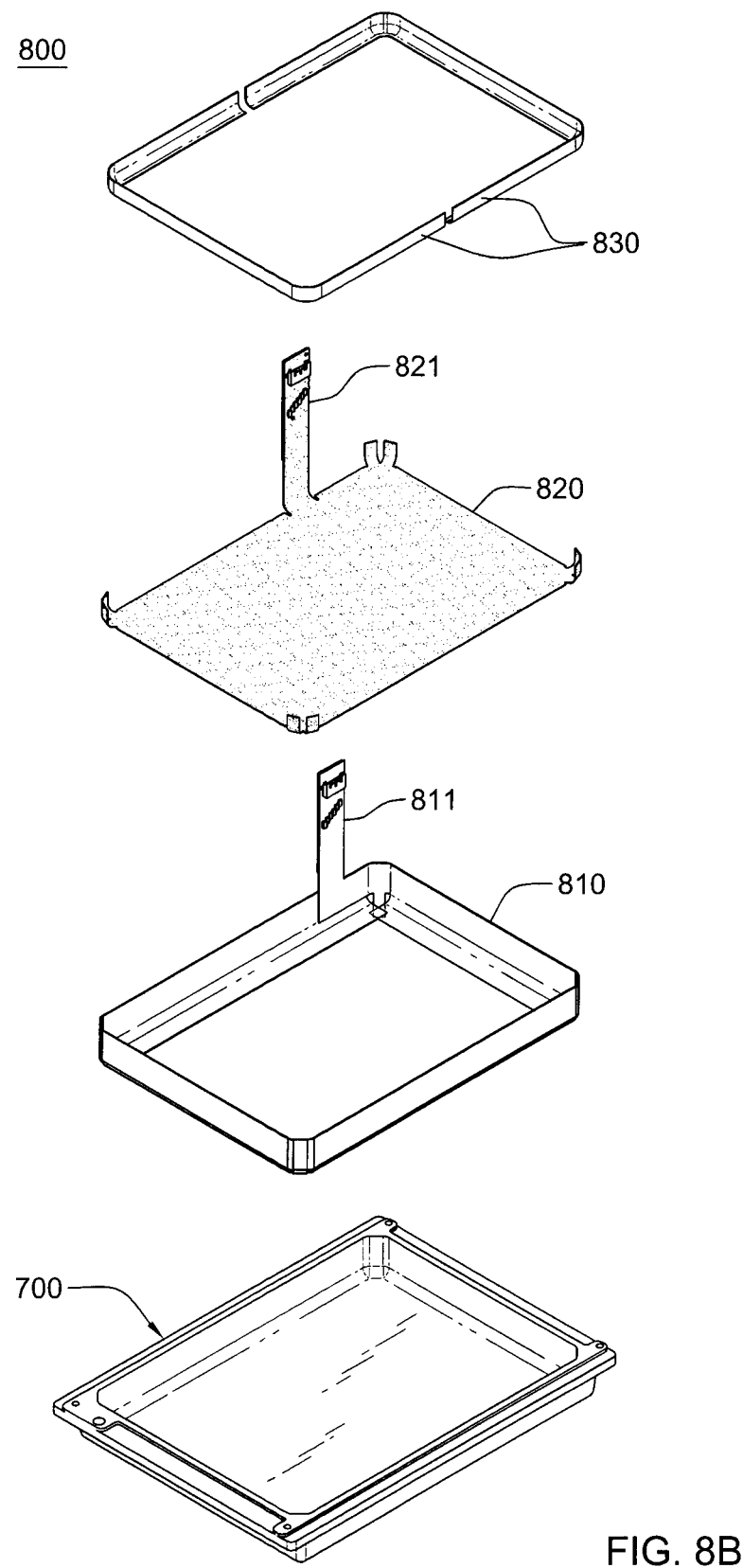
FIG. 8B depicts an exploded view of the tamper-respondent assembly of FIG. 8A, in accordance with one or more aspects of the present invention.

FIGS. 8A & 8B depict underside, isometric views of a further embodiment of a tamper-respondent assembly employing electronic enclosure 700. Referring collectively to FIGS. 8A & 8B, in one or more implementations, tamper-respondent assembly 800 includes electronic enclosure 700 which, as noted, is to enclose, at least in part, one or more electronic components or an electronic assembly to be protected. Electronic enclosure 700 includes an inner main surface, and an inner sidewall surface including at least one inner-sidewall corner, such as described above in connection with FIG. 7. Further, tamper-respondent assembly 800 includes a tamper-respondent electronic circuit structure which includes at least one tamper-respondent sensor mounted to and covering, at least in part, the inner surface(s) of electronic enclosure 700. As explained further below, the tamper-respondent sensor(s) is configured so as to facilitate good contact, and good adhesion, of the sensor to the inner surfaces of the enclosure, such as, for instance, the one or more inner-sidewall corners of the electronic enclosure 700, to provide secure coverage of the tamper-respondent sensor(s) over the inner surface(s) of the electronic enclosure.

As illustrated, in one or more implementations, the tamper-respondent electronic circuit structure associated with electronic enclosure 700 may include an inner-sidewall tamper-respondent sensor 810 and an inner main surface tamper-respondent sensor 820, along with a security band 830. In the illustrated example, inner-sidewall tamper-respondent sensor 810 may be formed with an integrated flex ribbon cable or extension 811 to facilitate electrical connection of the at least one resistive network within inner-sidewall tamper-respondent sensor 810 to appropriate monitor circuitry (not shown) disposed within, for instance, the secure volume defined, at least in part, by the tamper-respondent assembly of FIGS. 8A & 8B. Similarly, inner main surface tamper-respondent sensor 820 may be configured with an integrated flex ribbon cable or extension 821 to facilitate electrical connection of inner main surface tamper-respondent sensor 820 to the monitor circuitry, as well. A bonding agent (not shown), such as a thermoset adhesive, may be employed to adhere inner-sidewall tamper-respondent sensor 820 to the inner sidewall surface and to inner-sidewall corners. A similar adhesive could be used to adhere inner main surface tamper-respondent sensor 820 to inner main surface and to inner-sidewall tamper-respondent sensor 810 where the sensors overlap. Security band 830 may further be adhesively secured over the overlap between inner main surface tamper-respondent sensor 820 and inner-sidewall tamper-respondent sensor 810 covering, in one or more implementations, transition regions between the inner sidewall surface and the inner main surface around the inner perimeter of electronics enclosure 700.

Note that, in the example provided in FIGS. 8A & 8B, inner-sidewall tamper-respondent sensor 810 and inner main surface tamper-respondent sensor 820 are discrete tamper-respondent sensors that overlap, at least in part, and facilitate defining a secure volume about the at least one electronic component to be protected. For instance, the secure volume may be defined by flipping over and securing the illustrated tamper-respondent assembly of FIGS. 8A & 8B to a multilayer circuit board with an embedded tamper-respondent sensor, such as described above.

Figure 9A:
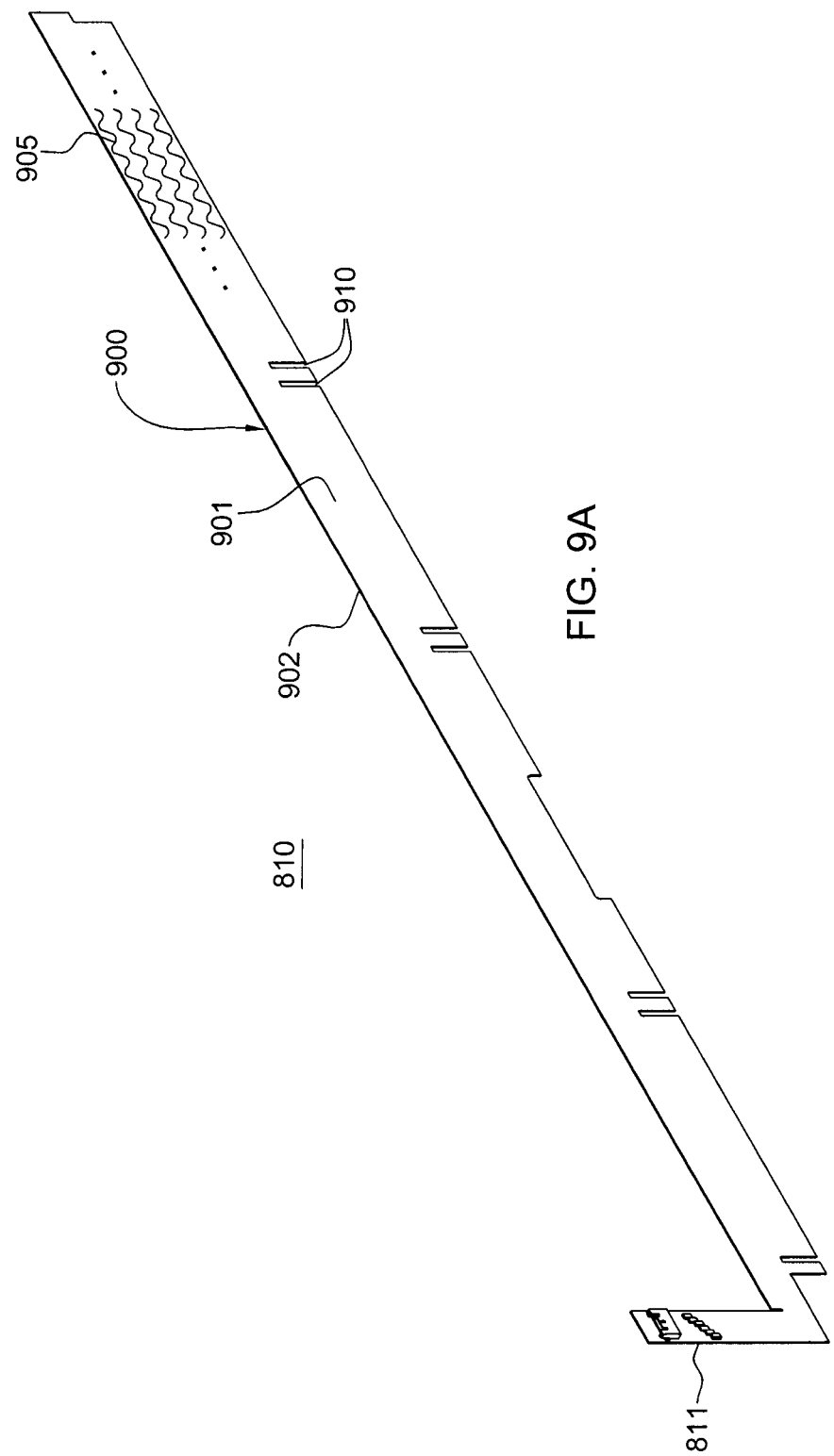
FIG. 9A is an isometric view of one embodiment of an inner-sidewall tamper-respondent sensor for covering an inner sidewall surface of the electronic enclosure, in accordance with one or more aspects of the present invention.

FIG. 9A depicts one embodiment of inner-sidewall tamper-respondent sensor 810 of FIGS. 8A & 8B. In this embodiment, inner-sidewall tamper-respondent sensor 810 includes at least one first layer 900 having opposite first and second sides 901, 902, and circuit lines 905 extending substantially over all of the flexible layer, and forming at least one tamper-detect network, such as described herein. For instance, circuit lines 905 may be disposed on at least one of first side 901 or second side 902 of the at least one flexible layer 900. Note that the at least one flexible layer 900 may be fabricated as a conventional security sensor layer, or be fabricated as one of the enhanced, tamper-respondent sensors described herein. In particular, although illustrated as a non-formed, flexible layer, the at least one flexible layer 900 of inner-sidewall tamper-respondent sensor 810 could comprise a flexible layer, such as described above. As noted, extension 811 may extend from inner-sidewall tamper-respondent sensor 810 to facilitate electrical connection of the at least one resistive network of the inner-sidewall tamper-respondent sensor 810 to appropriate monitor circuitry (not shown) disposed within, for instance, the secure volume defined, at least in part, by the tamper-respondent assembly of FIGS. 8A & 8B. As illustrated, in one or more implementations, inner-sidewall tamper-respondent sensor 810 is of sufficient length to encircle the inside of the electronic enclosure, covering the inner sidewall surface thereof, and overlap at its ends. Further, multiple slots 910 are provided within inner-sidewall tamper-respondent sensor 810. These multiple slots 910 are sized and positioned along the inner-sidewall tamper-respondent sensor so as to approximately align (in one or more embodiments) to respective inner-sidewall corners of the electronic enclosure to facilitate good contact, and good adhering, and bending the sensor within the inner-sidewall corners of the electronic enclosure, for instance, by allowing for regions of overlap of the inner-sidewall tamper-respondent sensor on itself.

Figure 9B:
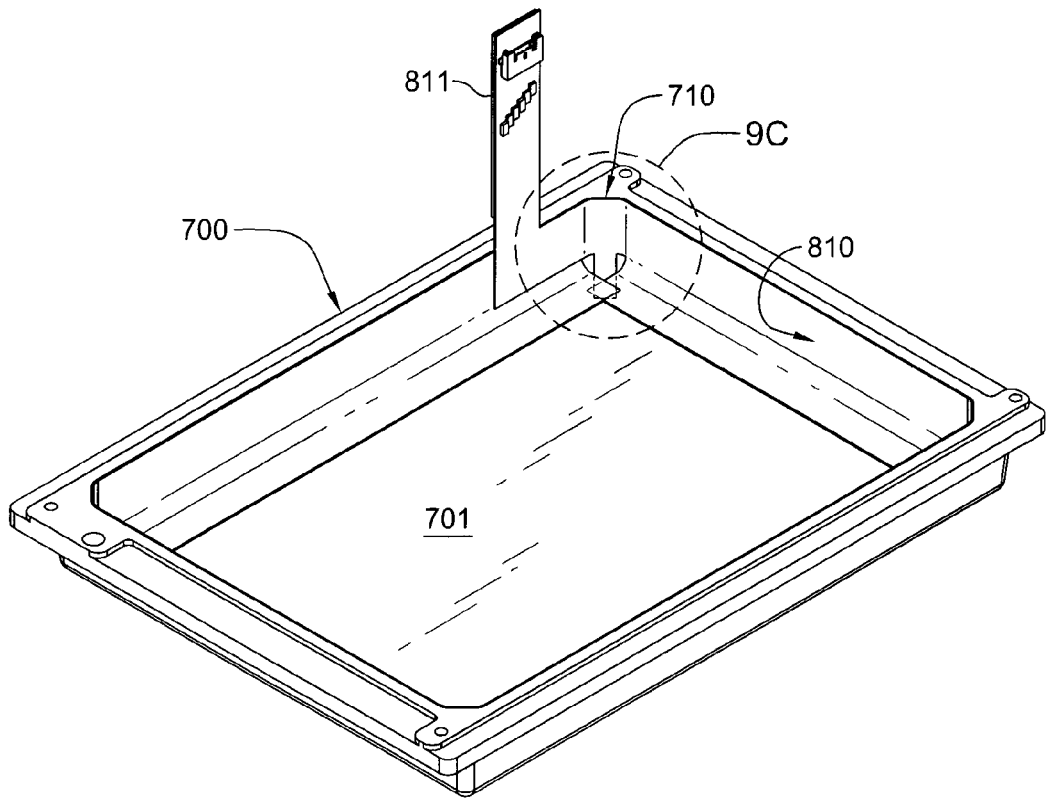
FIG. 9B depicts an underside, isometric view of the electronic enclosure and inner-sidewall tamper-respondent sensor of FIGS. 8A & 8B, with the inner-sidewall tamper-respondent sensor shown positioned over the inner sidewall surface of the electronic enclosure, in accordance with one or more aspects of the present invention.
Figure 9C:
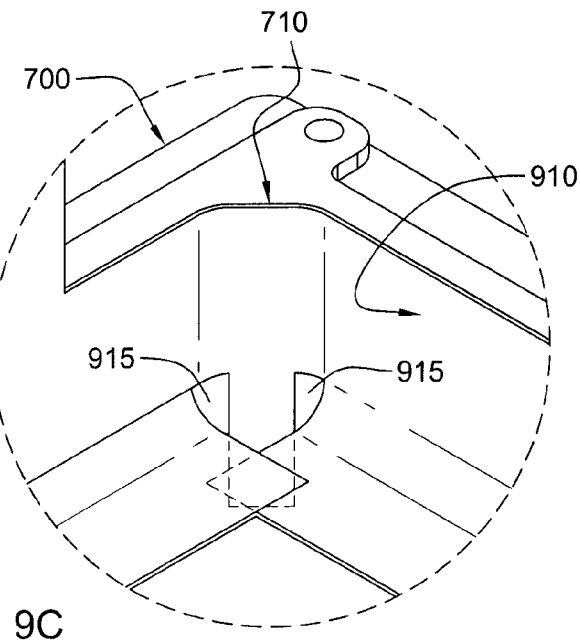
FIG. 9C is an enlarged depiction of the tamper-respondent assembly of FIG. 9B, illustrating region 9C thereof, in accordance with one or more aspects of the present invention.

FIGS. 9B & 9C depict one embodiment of inner-sidewall tamper-respondent sensor 810 mounted within electronic enclosure 700. As illustrated, in the exemplary embodiment, the inner-sidewall tamper-respondent sensor includes first and second slots that respectively overlie, at least in part, the first and second curved-sidewall portions of the associated inner-sidewall corner 710 to be covered. These first and second slots are spaced apart to reside at opposite sides of the flat, angled-sidewall portion of the inner-sidewall corner 710, and facilitate reducing the amount of material in the corner and thereby enhance good contact and adhesion of the inner-sidewall tamper-respondent sensor 810 to the inner sidewall surface of the electronic enclosure, including at the inner-sidewall corners thereof, while also reducing stress on the sensor within the corner(s). For instance, the multiple slots 910 allow for overlapping of the inner-sidewall tamper-respondent sensor on itself at the inner-sidewall corners, as illustrated. Note that, in this configuration, the inner-sidewall tamper-respondent sensor 810 has a width which allows the sensor to cover the transition regions, as well as extend over, in part, the inner main surface of electronic enclosure 700. Note also that one or more uncovered regions 915 may result from the presence of the slots when the inner-sidewall tamper-respondent sensor 810 is wrapped around the inner sidewall surface as shown, exposing portions of the inner sidewall surface at the inner-sidewall corner(s), for instance, along the seams where the inner-sidewall tamper-respondent sensor overlaps at the corner. As explained below, these regions 915 may be covered or protected by inner main surface tamper-respondent sensor 820 corner tabs once that sensor and its corner tabs are adhered to the assembly. This is illustrated, by way of example, in FIGS. 10A-10C.

Figure 10A:
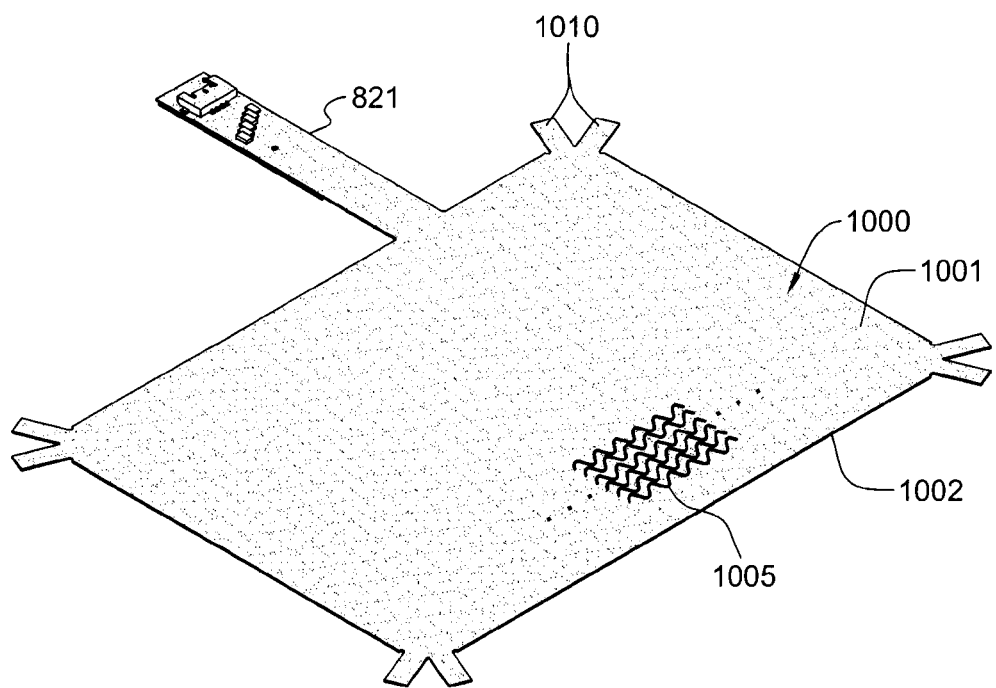
FIG. 10A is an enlarged depiction of the inner main surface tamper-respondent sensor embodiment illustrated in FIGS. 8A & 8B, in accordance with one or more aspects of the present invention.
Figure 10B:
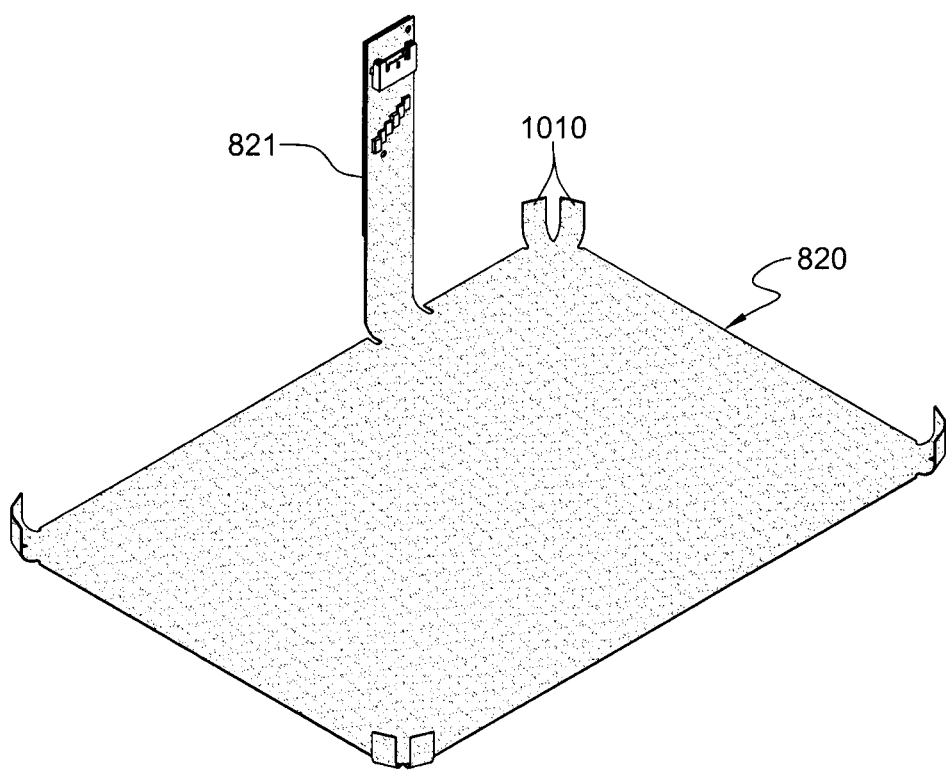
FIG. 10B depicts the inner main surface tamper-respondent sensor of FIG. 10A, with the corner tabs shown raised for positioning, as illustrated in FIGS. 8A & 8B, in accordance with one or more aspects of the present invention.
Figure 10C:
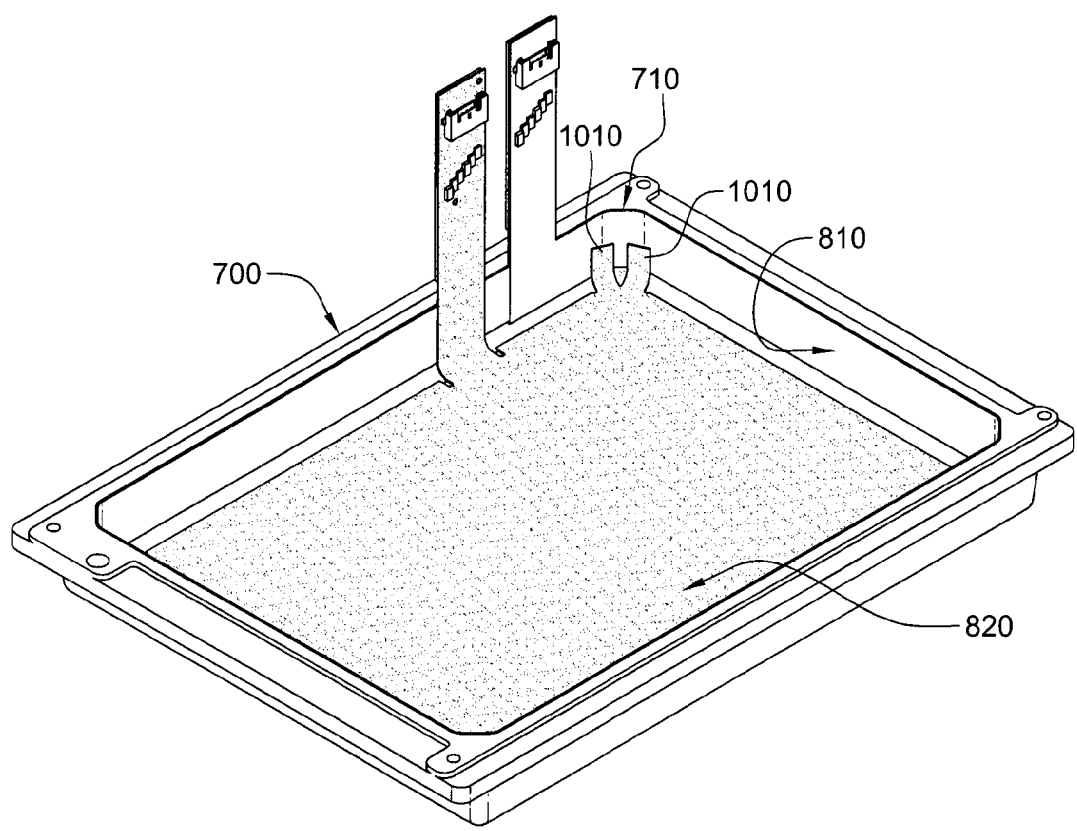
FIG. 10C depicts the tamper-respondent assembly of FIGS. 8A & 8B, with the inner main surface tamper-respondent sensor positioned therein, and with the security elements(s) removed, in accordance with one or more aspects of the present invention.

Referring collectively to FIGS. 10A-10C, inner main surface tamper-respondent sensor 820 includes at least one flexible layer 1000 having opposite first and second sides 1001, 1002, and circuit lines 1005 extending substantially over all of the flexible layer 1000 and forming at least one tamper-detect network, such as described herein. For instance, circuit lines 1005 are disposed on one or both of first side 1001 and second side 1002 of the at least one flexible layer 1000, as described. As noted above, the at least one flexible layer 1000 may be fabricated as a conventional security sensor layer, or be fabricated as one of the enhanced, tamper-respondent sensors described herein. In particular, although illustrated as a non-formed, flexible layer, the at least one flexible layer 1000 of inner main surface tamper-respondent sensor 820 could comprise a flexible layer, such as described above. As noted, extension 821 may be formed integral with inner main surface tamper-respondent sensor 820 to facilitate electrical connection of the at least one associated resistive network to monitor circuitry (not shown) within the secure volume being defined, at least in part, by the tamper-respondent assembly of FIGS. 8A & 8B; for instance, in association with a multilayer circuit board having an embedded tamper-respondent sensor therein, as described above.

In the depicted configuration, multiple corner tabs 1010 are provided, with at least one corner tab 1010 being provided at the at least one inner-sidewall corner. In the exemplary embodiment illustrated, two corner tabs 1010 are provided at each corner of the inner main surface tamper-respondent sensor 820. These corner tabs 1010 include circuit lines 1005 (FIG. 10A) and are sized to cover a respective one of the uncovered regions 915 in inner-sidewall tamper-respondent sensor and enclosure assembly which remain after securing inner-sidewall tamper-respondent sensor 810 to electronic enclosure 700, as illustrated in FIGS. 10B & 10C. In particular, those skilled in the art should understand that corner tabs 1010 include respective portions of the at least one tamper-detect network provided by inner main surface tamper-respondent sensor 820, such that if an attempt were made to breach the tamper-respondent assembly 800 through the underlying, uncovered regions 915 of the inner sidewall surface, the respective corner tab would be contacted, thereby resulting in detection of the attempted breach.

As noted above in connection with FIGS. 8A & 8B, reinforcement of the overlap between inner-sidewall tamper-respondent sensor 810 (FIG. 15A) and inner main surface tamper-respondent sensor 820 (FIG. 15A) may be provided, in one or more implementations, by one or more physical security structures, such as security band 830. One potential point of exposure for a tamper-respondent assembly such as described herein would be at an overlap between two or more tamper-respondent sensors, such as at an overlap between an inner-sidewall tamper-respondent sensor and an inner main surface tamper-respondent sensor. For instance, an attack on a tamper-respondent assembly could entail drilling through the enclosure and chemically attaching an overlapped bond area between two tamper-respondent sensors of the tamper-respondent electronic circuit structure, such as the overlap area where inner main surface tamper-respondent sensor 820 is adhesively secured over inner-sidewall tamper-respondent sensor 810. To address this concern, a physical security structure, such as security band 830, may be provided. Note that security band 830 is one embodiment only of a physical security structure which could be employed to overlie and physically secure in place, at least in part, one or more tamper-respondent sensors covering one or more inner surfaces of an electronic enclosure, such as described herein.

Generally stated, in one or more implementations, disclosed herein is a tamper-respondent assembly which includes an electronic enclosure to enclose, at least in part, at least one electronic component to be protected, wherein the electronic enclosure includes an inner surface. The tamper-respondent assembly also includes a tamper-respondent electronic circuit structure comprising a tamper-respondent sensor lining and covering, at least in part, the inner surface of the electronic enclosure. The tamper-respondent sensor may include a flexible layer having opposite first and second sides, and circuit lines substantially covering at least one of the first side or the second side of the flexible layer, forming at least one tamper-respondent network, such as described herein. The flexible layer of the tamper-respondent sensor could be a non-formed sensor layer or a formed sensor layer, in accordance with one or more of the sensor layer embodiments described herein.

Figure 11:
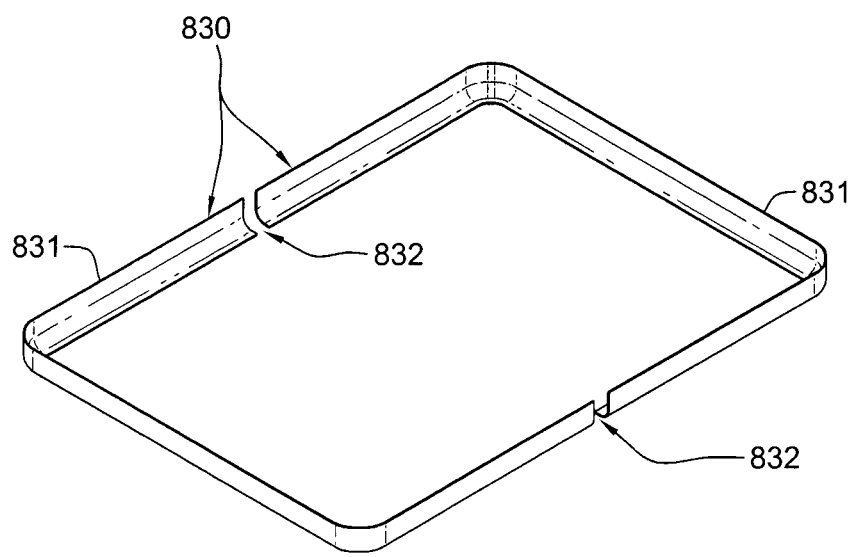
FIG. 11 is a perspective view of the security element(s) illustrated in FIGS. 8A & 8B for the tamper-respondent assembly, in accordance with one or more aspects of the present invention.

The tamper-respondent assembly further includes a physical security structure, such as at least one security element, that overlies and physically secures in place, at least in part, the tamper-respondent sensor covering, at least in part, the inner surface of the electronic enclosure. In the embodiment of FIGS. 8A & 8B, security band 830 is illustrated which includes multiple security elements 831, as shown in enlarged view in FIG. 11. Note that the security structure, such as security band 830, could comprise a single element or multiple elements, depending on the desired configuration. In the example of FIGS. 8A, 8B & 11, two substantially identical, U-shaped security elements 831 are illustrated, by way of example only. In the depicted embodiment, security elements 831 are spaced apart, with gaps 832 therebetween. By providing two or more security elements 831, to define a desired physical security structure (such as security band 830) manufacturing tolerances may be better accommodated within the tamper-respondent assembly. By way of example, the gaps 832 between adjacent security elements of the multiple, distinct security elements 831, may be on the order of several millimeters. Note that although illustrated as two security elements 831, any number of physical security elements could be provided within the tamper-respondent assembly, and any number of security structures, such as multiple security bands or plates, could be provided within the tamper-respondent assembly as desired to provide additional mechanical securing of the tamper-respondent sensor(s) in place over the inner surface of the electronic enclosure.

In the example of FIGS. 8A, 8B & 11, the physical security structure is configured as a security band or collar comprising multiple distinct security elements 831 which extends substantially fully around the inner perimeter of the electronic enclosure 700. The security band 830 is sized and positioned to overlie and physically secure in place at least the overlap of the inner main surface tamper-respondent sensor and the inner-sidewall tamper-respondent sensor, as illustrated in FIG. 8A. In one or more implementations, security band 830 may be adhesively secured to the tamper-respondent sensors. Note that in this example, security band 830, comprising security elements 831, extends around the inner perimeter, including through the inner-sidewall corners, as illustrated in FIG. 8A. In this manner, security elements 831 advantageously overlie and secure in place the overlap(s) of the inner-sidewall tamper-respondent sensor and the inner main surface tamper-respondent sensor at the inner-sidewall corners of the electronic enclosure. By way of example, in the embodiment depicted, security band 830, or more particularly, security elements 831, overlie and physically secure in place the multiple corner tabs 1010 (FIG. 10C) projecting from the inner main surface tamper-respondent sensor 820 at the inner-sidewall corners of the electronic enclosure. This advantageously prevents an attack against the tamper-respondent assembly through the areas lined by the multiple corner tabs projecting from the inner main surface of the tamper-respondent sensor. The security band 830 creates a mechanical barrier that prevents the tamper-respondent sensors from being separated.

In one or more enhanced embodiments, the security element(s) defining the security band, or more generally, the physical security structure, are formed (for instance, by stamping) a metal material, or metal alloy, such as copper, soft stainless steel, etc. Further, the metal security element(s) may advantageously be electrically connected to ground to further enhance detection capabilities of the tamper-respondent assembly. By forming the security element(s) of a metal that is difficult to drill through, then, if an attempt were made to drill through the security element, metal fragments would be created, which potentially could be pulled into the sensor layer(s) lining the inner surface of the electronic enclosure, which would result in a greater chance of shorting or otherwise damaging the circuit lines forming the one or more tamper-respondent networks of the sensor during the attack, and thus enhance detection capability of the tamper-respondent sensor. Further, by electrically grounding the security element(s), then a drill contacting the grounded security element(s) after drilling through one or more tamper-respondent sensors would be more likely to short one or more of the circuit lines forming the at least one tamper-detect network in the associated tamper-respondent sensor(s). By grounding the security element(s), another path for current to flow is established, which advantageously increases the likelihood of detecting an attempt to tamper with the tamper-respondent assembly. Note that grounding of the security element(s) could be by any means, such as by electrically connecting the elements to one or more ground lines on the electronic assembly being protected by the tamper-respondent assembly, or (in certain of the embodiments disclosed herein) by electrically connecting the elements to one or more ground planes within the multilayer circuit board forming, in part, the secure volume about the electronic assembly being protected. In one or more implementations, the security element(s), or more generally, the security band or physical security structure, may be preformed (e.g., by stamping) into the desired shape, for example, to accommodate and overlie the overlap between the inner-sidewall tamper-respondent sensor and the inner main surface tamper-respondent sensor, such as depicted in FIG. 8A.

As noted above, in one or more implementations, an air path may be provided through the tamper-respondent assembly to allow, for instance, pressure equalization between the secure volume within the assembly and air pressure external to the tamper-respondent assembly. For instance, pressure may increase within the sealed secure volume during normal operation of the protected electronic component(s) as temperature within the secure volume increases. Further, it may be desirable to provide a means to dissipate any pressure the secure volume and pressure extend the assembly, as might occur with air pressure changes, due to, for instance, air transport of the tamper-respondent assembly.

Generally stated, provided herein, in one or more further aspects, is a tamper-respondent assembly which includes an electronic enclosure to enclose, at least part, at least one electronic component to be protected. The electronic enclosure includes an inner surface and an air vent. A tamper-respondent electronic circuit structure is provided which includes a tamper-respondent sensor that covers, at least in part, the inner surface of the electronic enclosure, and defines, at least in part, a secure volume about the at least one electronic component. A vent structure is also provided within the assembly that includes at least one air passage coupling in fluid communication the secure volume and the air vent of the electronic enclosure to provide an air pathway to allow air pressure within the secure volume to equalize with air pressure external to the tamper-respondent assembly.

For instance, in one or more implementations, the tamper-respondent assembly overlies an opening of the air vent at the inner surface of the electronic enclosure, and the vent structure is disposed or sandwiched, in part, within an overlap region of the tamper-respondent sensor, with one end of the at least one air passage in fluid communication with the secure volume, and another end in fluid communication with the opening of the air vent at the inner surface of the electronic enclosure. As a specific example, the air vent in the electronic enclosure may include a channel formed in an inner sidewall corner of the electronic enclosure, and the at least one air passage of the vent structure may couple in fluid communication the secure volume and the channel of the air vent, wherein the tamper-respondent sensor overlies, the channel of the air vent in the electronic enclosure.

In one or more implementations, the tamper-respondent sensor of the assembly may be an inner sidewall tamper-respondent sensor which is disposed along an inner sidewall of the electronic enclosure, for instance, such as described above in connection with FIGS. 8A-9C. Further, the tamper-respondent electronic circuit structure may include an inner main surface tamper-respondent sensor, and together the inner sidewall tamper-respondent sensor and inner main surface tamper-respondent sensor may be configured and positioned to cover the inner surface of the electronic enclosure to facilitate defining the secure volume about the at least one electronic component to be protected. In this configuration, the vent structure may be disposed, in part, within an overlap region of the inner sidewall tamper-respondent sensor, along the inner sidewall of the electronic enclosure, as explained further below.

Additionally, in one or more implementations, a multilayer circuit board may be provided to which the electronic enclosure seals or is affixed. The multilayer circuit board may include an embedded tamper-respondent sensor, such as described above, and the tamper-respondent sensor and embedded tamper-respondent sensor together may define the secure volume about the at least one electronic component.

The vent structure may be implemented in a variety of configurations. For instance, the vent structure may be or include a thin, flat vent plate, which includes the at least one air passage. By way of example, the at least one air passage may extend between opposing first and second ends of the vent plate, and opposite main sides of the vent plate may be substantially parallel, with the vent plate being, in one or more implementations, a thin, multilayer vent plate formed multiple layers, such as multiple metal layers. By way of example, the multilayer vent plate may be a rigid or semi-rigid structure, such as a metal, polymer or plastic structure, and adjacent layers of the multilayer structure may be strongly affixed together. For instance, where the vent plate is a metal structure, adjacent metal layers of the multilayer vent plate may be welded, soldered and/or brazed together.

In one or more embodiments, the at least one air passage of the vent structure includes one or more directional changes greater than 90°, for instance, a zigzag pattern. In one or more embodiments, the at least one air passage may have a directional component in an opposite direction to a direction of the air passage(s) before the directional change. Additionally, in one or more implementations, the at least one air passage of the vent structure may include multiple zigzag directional changes, with one or more of the directional changes having associated therewith a false, terminating passage, which extends within the vent structure from the directional change(s) to make insertion of, for instance, a wire through the air passage(s) difficult, if not impossible.

By way of specific example, the air passage within the vent structure may be extremely small, with a characteristic dimension of (for instance) 0.1 to 0.2 mm, such as 0.15 mm, and may include multiple zigzag directional changes which prohibit the insertion of a wire down the length of the air passage(s). Further, the vent structure is thin and flat to prevent drilling or other intrusions, that is, without protruding out through the vent structure and contacting the associated tamper-respondent sensor sandwiching the vent structure. Advantageously the thickness and overall size of the vent structure disclosed herein allows adequate adhesion between layers of the tamper-respondent sensor within, for instance, an overlap region of the tamper-respondent sensor disposed along the inner sidewall of the electronic enclosure, which would cause an tamper vent to occur should an attempt be made to breach the secure volume through the air passageway, or in its immediate vicinity using, for instance, a wire, drill, or laser, etc. In one or more implementations, the vent structure may include one or more air passages that are irregularly shaped, and may include one or more false paths, making a breach through the vent structure even more difficult.

Figure 12A:
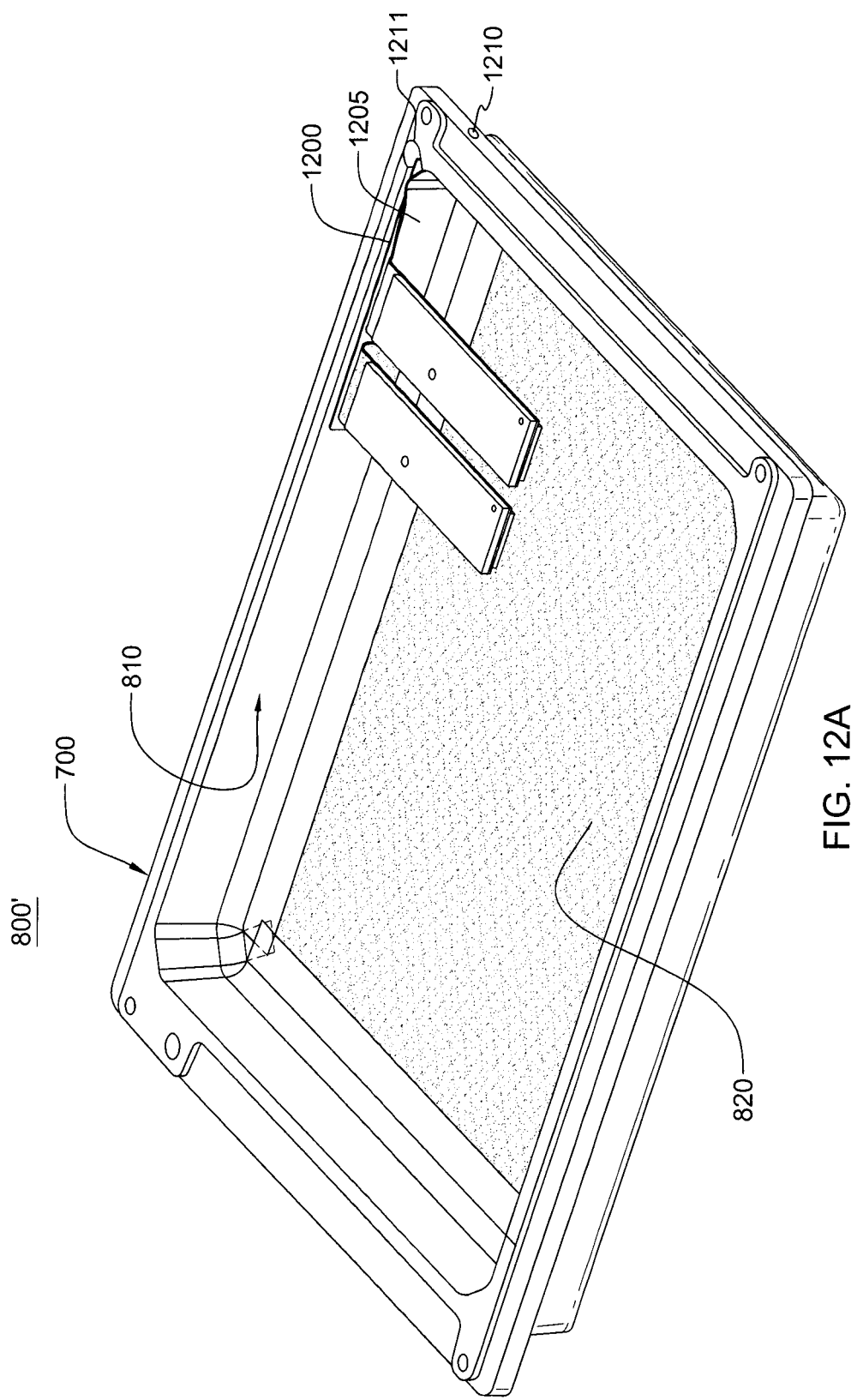
FIG. 12A depicts one embodiment of a tamper-respondent assembly, such as disclosed herein, further comprising an air vent in the electronic enclosure and a vent structure providing fluid communication between the secure volume and the air vent in the electronic enclosure, in accordance with one or more aspects of the present invention.

By way of example, FIG. 12A is an isometric view of one embodiment of an enhanced tamper-respondent assembly 800' similar to tamper-respondent assembly 800 described above in connection with FIGS. 8A-11, but with the addition of a vent structure 1200 disposed at the inner sidewall of electronic enclosure 700 within an overlap region 1205 of inner sidewall tamper-respondent sensor 810. Further, an air vent 1210 is provided through electronic enclosure 700. This air vent includes, in one or more implementations, a channel 1211 formed (in the embodiment depicted) within an inner corner of electronic enclosure 700.

Figure 12B:
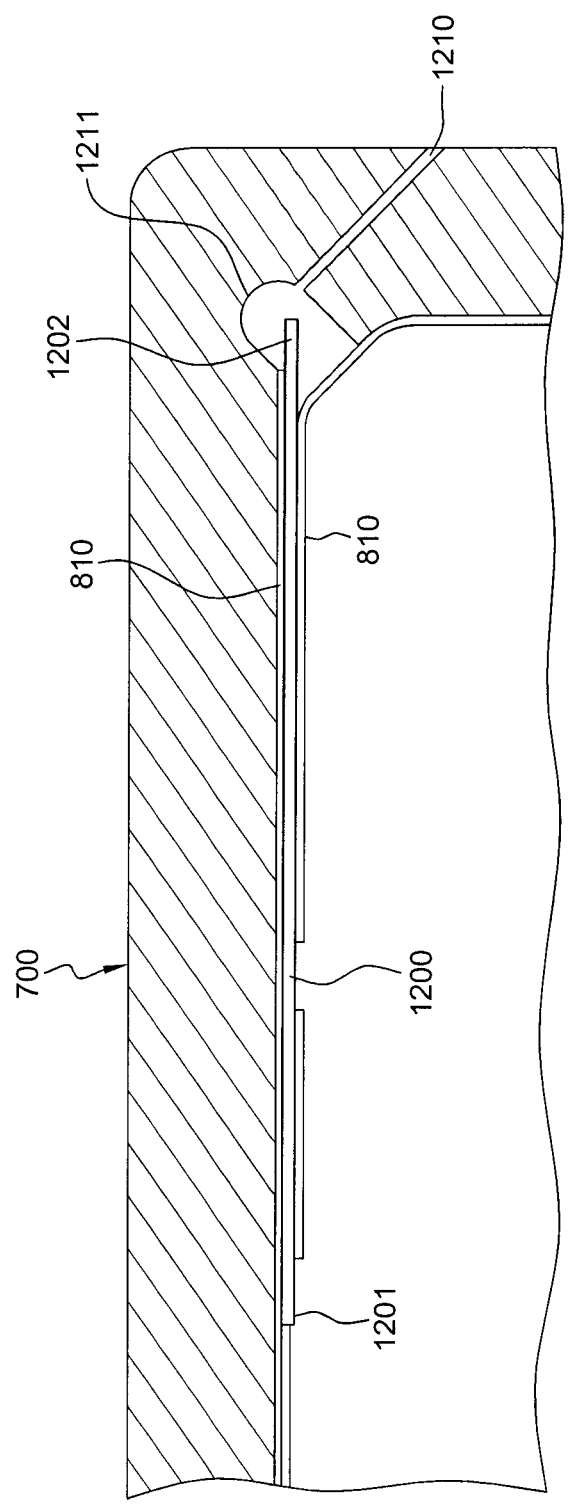
FIG. 12B is a partial, enlarged plan view of the tamper-respondent assembly of FIG. 12A, illustrating region 12B thereof, in accordance with one or more aspects of the present invention.

FIG. 12B is an enlarged partial depiction of the tamper-respondent assembly 800' of FIG. 12A, showing in greater detail one embodiment for positioning vent structure 1200 within the tamper-respondent assembly. As explained above, in one or more implementations, inner sidewall tamper-respondent sensor 810 wraps around and covers the inner sidewall surface of electronic enclosure 700, overlapping in overlap region 1205, which in this case, is positioned adjacent to a sidewall corner 710 comprising channel 1211 of air vent 1210 through electronic enclosure 700. As illustrated in FIG. 12B, tamper-respondent sensor 810 overlies and covers channel 1211, such that any attempt to reach the secure volume protected by the tamper-respondent sensor(s) would need to penetrate tamper-respondent sensor 810.

In one or more aspects, vent structure 1200 may reside or be sandwiched between opposite ends of inner sidewall tamper-respondent sensor 810 in overlap region 1205 and be positioned such that one end 1201 of vent structure 1200 projects out past overlap region 1205 of inner sidewall tamper-respondent sensor 810 into the secure volume, and another, opposite end 1202 of vent structure 1200 extends into or is exposed at channel 1211 of air vent 1210. Note that in depicted configuration, vent structure 1200 includes, or comprises, a vent plate having opposite main sides in contact with respective portions of inner sidewall tamper-respondent sensor 810, and including at least one air passage extending, for instance, between opposite ends 1201, 1202 of vent structure 1200.

Figure 13A:
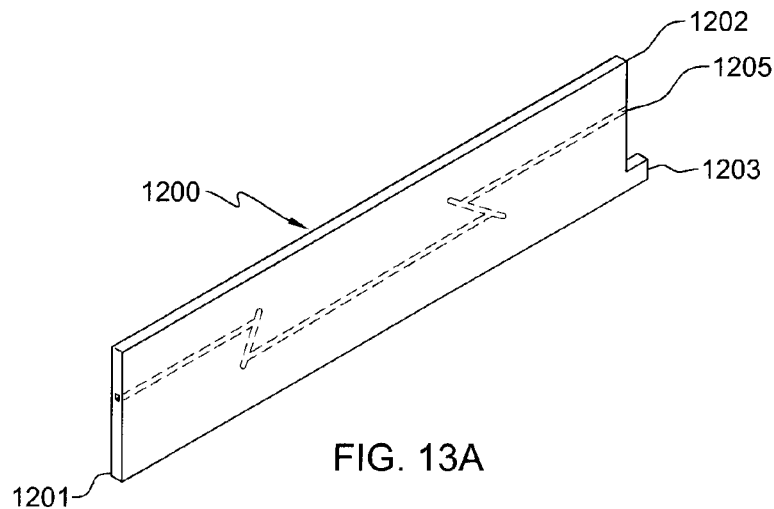
FIG. 13A depicts one embodiment of a vent structure for a tamper-respondent assembly, in accordance with one or more aspects of the present invention.

As depicted in the exemplary embodiment of FIG. 13A, vent structure 1200 may include a tab 1203 projecting from end 1202 thereof. In use, tab 1203 may reside or project into channel 1211 of air vent 1210, and operate as a stop contacting the inner wall of electronic enclosure 700 defining, channel 1211. This ensures that the air passage(s) 1205 through vent structure 1200 is spaced back from the inner wall defining channel 1211, and thus, in good fluid communication with air vent 1210 of electronic enclosure 700. Further, tab 1203 may assist in blocking adhesive used to secure electronic enclosure 700 to, for instance, a multilayer circuit board, from reaching into the air path defined by the air passage(s) in vent structure 1200 and the air vent 1210 in electronic enclosure 700.

In one or more implementations, vent structure 1200 is formed of a rigid or semi-rigid material, such as a metal, plastic, or polymer and includes one or more air passages 1205 formed within specified tolerances so as to provide a "repeatable" air flow rate or exchange rate between the secure volume within the tamper-respondent assembly and air external to the tamper-respondent assembly. Vent structure 1200 may be formed from a variety of fabrication techniques. For instance, vent structure 1200 could be fabricated as a single part, such as by pad print, stereolithography (SLA), or other 3D printing approach, or other method, to create, for instance, a thin vent plate with one or more irregular shaped air passages or channels extending through the plate from, for instance, one end to the other. Note that the air passage(s) 1205 through vent structure 1200 could be two dimensional, or even three dimensional, depending, for instance, on thickness of the vent structure. Two dimensional in this context refers to the air passage extending within, for instance, common plane between the opposite ends of the vent plate, while three dimensional would allow for the air passage(s) to pass through the vent plate via multiple planes. Note that vent structure 1200 of FIG. 13A is a flat structure with, in one or more implementations, parallel opposite main surfaces. In one specific implementation, vent structure 1200 is a rigid or semi-rigid structure, such as a metal structure, for instance, a stainless steel vent structure, with pieces soldered, welded or brazed together. In one implementation, the vent structure may be 40 mm wide by 10 mm in high, with the length selected as desired to extend within the overlap region of the tamper-respondent sensor so the opposite ends of the vent structure are in fluid communication with the secure volume and the air vent through the electronic enclosure.

Figure 13B:
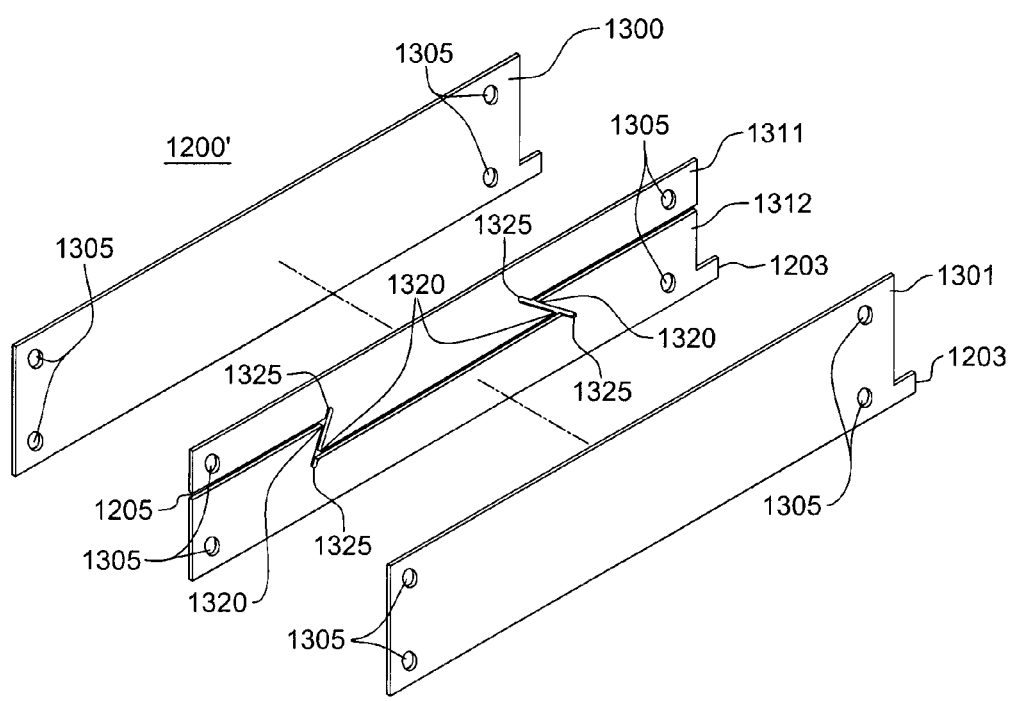
FIG. 13B is a partially exploded view of a multilayer vent plate implementation of the vent structure of FIG. 13A, in accordance with one or more aspects of the present invention.

FIG. 13B depicts a multilayer vent structure 1200' formed of multiple layers 1300, 1301, 1311 & 1312. In this configuration, middle layers 1311 & 1312 are co-planar and configured and positioned to define at least air passage 1205 therebetween, as illustrated. Middle layers 1311 could be repeated one or more times to, for instance, allow for construction of 3D air passages extending through the vent structure 1200' from one end 1201 to another end 1202. A first protective layer 1300 and a second protective layer 1301 are provided to sandwich middle layers 1311 & 1312 and hold the layers in fixed position. Any securing mechanism may be employed, with alignment openings 1305 being provided in the layers to facilitate their proper positioning. By way of example, where the layers 1300, 1301, 1311 & 1312 are metal layers, then each layer may be welded, soldered or brazed to its adjacent layers so as to hold middle layers 1311, 1312 in fixed position apart as illustrated in FIG. 13B, and thereby define the air passage(s) through the vent structure 1200'. By way of example, each layer 1300, 1301, 1311, 1312 may have a thickness in the range of 0.07 mm to 0.13 mm.

As illustrated in FIG. 13B, the one or more air passages 1205 through vent structure 1200' may include one or more directional changes 1320, with directional changes greater than 90° being depicted in the exemplary configuration if FIG. 13B. In combination with directional changes 1320, one or more false, terminating passages 1325 may be provided extending within the vent structure, but also terminating away from the directional change. In this configuration, a probe attempting to be inserted through air passage 1205 would be directed towards false, terminating passages 1325 at each directional change in the air passage, rendering it unlikely that a wire could be pushed through the air passage. This is further rendered unlikely by having the directional changes greater than 90°, for instance, in a zigzag pattern, as shown.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A tamper-respondent assembly comprising:
    an electronic enclosure to enclose, at least in part, at least one electronic component to be protected, the electronic enclosure comprising an inner surface and an air vent;
    a tamper-respondent electronic circuit structure comprising a tamper-respondent sensor covering, at least in part, the inner surface of the electronic enclosure, and defining, at least in part, a secure volume about the at least one electronic component;
    a vent structure comprising at least one air passage coupling in fluid communication the secure volume and the air vent of the electronic enclosure to allow air pressure within the secure volume to equalize with air pressure external to the tamper-respondent assembly;
    wherein the tamper-respondent sensor comprises an inner sidewall tamper-respondent sensor disposed along an inner sidewall of the electronic enclosure; and
    wherein the tamper-respondent electronic circuit structure further comprises an inner main surface tamper-respondent sensor, the inner sidewall tamper-respondent sensor and inner main surface tamper-respondent sensor being coupled to and covering, at least in part, the inner surface of the electronic enclosure to facilitate defining the secure volume about the at least one electronic component to be protected, and the vent structure being disposed, in part, between an overlap region of the inner sidewall tamper-respondent sensor, along the inner sidewall of the electronic enclosure.

2. The tamper-respondent assembly of claim 1, wherein the tamper-respondent assembly overlies on opening of the air vent at the inner surface of the electronic enclosure, and the vent structure is disposed, in part, between an overlap region the tamper-respondent sensor, with one end of the at least one air passage in fluid communication with the opening of the air vent at the inner surface of the electronic enclosure.

3. The tamper-respondent assembly of claim 1, wherein the air vent in the electronic enclosure is defined, at least in part, by a channel formed in a corner of the electronic enclosure, and the at least one air passage of the vent structure couples in fluid communication the secure volume and the channel of the air vent, wherein the tamper-respondent sensor overlies, at least in part, the channel of the air vent in the electronic enclosure.

4. The tamper-respondent assembly of claim 1, further comprising a multilayer circuit board, the electronic enclosure sealing to the multilayer circuit board, and the multilayer circuit board comprising an embedded tamper-respondent sensor, the tamper-respondent sensor and the embedded tamper-respondent sensor together defining the secure volume about the at least one electronic component.

5. The tamper-respondent assembly of claim 1, wherein the vent structure includes a vent plate comprising the at least one air passage.

6. The tamper-respondent assembly of claim 5, wherein the vent plate comprises a multilayer vent plate formed of multiple layers.

7. The tamper-respondent assembly of claim 6, wherein the multilayer vent plate is a metal structure, and adjacent layers of the multilayer vent plate are at least one of welded, soldered or brazed together.

8. The tamper-respondent assembly of claim 5, wherein the at least one air passage of the vent structure includes at least one directional change greater than 90°.

9. The tamper-respondent assembly of claim 5, wherein the at least one air passage of the vent structure includes multiple directional changes, at least one directional change of the multiple directional changes having a false, terminating passage extending within the vent structure from the at least one directional change of the at least one air passage.

10. An electronic package comprising:
at least one electronic component;
a tamper-respondent assembly to protect the at least one electronic component, the tamper-respondent assembly comprising:
an electronic enclosure enclosing, at least in part, the at least one electronic component, the electronic enclosure comprising an inner surface and an air vent;
a tamper-respondent electronic circuit structure comprising a tamper-respondent sensor covering, at least in part, the inner surface of the electronic enclosure, and defining, at least in part, a secure volume about the at least one electronic component;
a vent structure comprising at least one air passage coupling in fluid communication the secure volume and the air vent of the electronic enclosure to allow air pressure within the secure volume to equalize with air pressure external to the tamper-respondent assembly;
wherein the tamper-respondent sensor comprises an inner sidewall tamper-respondent sensor disposed along an inner sidewall of the electronic enclosure; and
wherein the tamper-respondent electronic circuit structure further comprises an inner main surface tamper-respondent sensor, the inner sidewall tamper-respondent sensor and inner main surface tamper-respondent sensor being coupled to and covering, at least in part, the inner surface of the electronic enclosure to facilitate defining the secure volume about the at least one electronic component to be protected, and the vent structure being disposed, in part, between an overlap region of the inner sidewall tamper-respondent sensor, along the inner sidewall of the electronic enclosure.

11. The electronic package of claim 10, wherein the tamper-respondent assembly overlies on opening of the air vent at the inner surface of the electronic enclosure, and the vent structure is disposed, in part, between an overlap region the tamper-respondent sensor, with one end of the at least one air passage in fluid communication with the opening of the air vent at the inner surface of the electronic enclosure.

12. The electronic package of claim 10, wherein the air vent in the electronic enclosure is defined, at least in part, by a channel formed in a corner of the electronic enclosure, and the at least one air passage of the vent structure couples in fluid communication the secure volume and the channel of the air vent, wherein the tamper-respondent sensor overlies, at least in part, the channel of the air vent in the electronic enclosure.

13. The electronic package of claim 10, wherein the vent structure includes a vent plate comprising the at least one air passage.

14. The amended package of claim 13, wherein the vent plate comprises a multilayer vent plate formed of multiple layers.

15. The electronic package of claim 14, wherein the multilayer vent plate is a metal structure, and adjacent layers of the multilayer vent plate are at least one of welded, soldered or brazed together.

16. The electronic package of claim 13, wherein the at least one air passage of the vent structure includes at least one directional change greater than 90°.

17. The electronic package of claim 13, wherein the at least one air passage of the vent structure includes multiple directional changes, at least one directional change of the multiple directional changes having a false, terminating passage extending within the vent structure from the at least one directional change of the at least one air passage.

18. A fabrication method comprising:
fabricating a tamper-respondent assembly, the fabricating comprising:
providing an electronic enclosure to enclose, at least in part, at least one electronic component to be protected, the electronic enclosure comprising an inner surface and an air vent;
providing a tamper-respondent electronic circuit structure comprising a tamper-respondent sensor covering, at least in part, the inner surface of the electronic enclosure, and defining, at least in part, a secure volume about the at least one electronic component;
providing a vent structure comprising at least one air passage coupling in fluid communication the secure volume and the air vent of the electronic enclosure to allow air pressure within the secure volume to equalize with air pressure external to the tamper-respondent assembly;
wherein the tamper-respondent sensor comprises an inner sidewall tamper-respondent sensor disposed along an inner sidewall of the electronic enclosure; and
wherein the tamper-respondent electronic circuit structure further comprises an inner main surface tamper-respondent sensor, the inner sidewall tamper-respondent sensor and inner main surface tamper-respondent sensor being coupled to and covering, at least in part, the inner surface of the electronic enclosure to facilitate defining the secure volume about the at least one electronic component to be protected, and the vent structure being disposed, in part, between an overlap region of the inner sidewall tamper-respondent sensor, along the inner sidewall of the electronic enclosure.

* * * * *